United States Patent
Yamamoto et al.

(10) Patent No.: US 9,927,594 B2
(45) Date of Patent: Mar. 27, 2018

(54) IMAGE PICKUP MODULE MANUFACTURING METHOD AND IMAGE PICKUP MODULE MANUFACTURING DEVICE

(71) Applicant: FUJIFILM Corporation, Tokyo (JP)

(72) Inventors: Kiyofumi Yamamoto, Saitama (JP); Tatsuya Fujinami, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 141 days.

(21) Appl. No.: 15/074,225

(22) Filed: Mar. 18, 2016

(65) Prior Publication Data
US 2016/0205295 A1 Jul. 14, 2016

Related U.S. Application Data

(63) Continuation of application No. PCT/JP2014/065465, filed on Jun. 11, 2014.

(30) Foreign Application Priority Data

Sep. 20, 2013 (JP) .................................. 2013-195559

(51) Int. Cl.
*H04N 5/225* (2006.01)
*G02B 7/02* (2006.01)
(Continued)

(52) U.S. Cl.
CPC ............... *G02B 7/02* (2013.01); *H04N 5/225* (2013.01); *H04N 5/2253* (2013.01);
(Continued)

(58) Field of Classification Search
CPC .. H04N 5/2253; H04N 5/2257; H04N 5/2254; H04N 5/23212; Y10T 29/4978; Y10T 29/49771; Y10T 29/49778
See application file for complete search history.

(56) References Cited

U.S. PATENT DOCUMENTS

2005/0237418 A1 10/2005 Sakamoto
2009/0180021 A1 7/2009 Kikuchi et al.

FOREIGN PATENT DOCUMENTS

JP 11-202178 A 7/1999
JP 2004-80774 A 3/2004
(Continued)

OTHER PUBLICATIONS

International Search Report for PCT/JP2014/065465 (PCT/ISA/210) dated Jul. 8, 2014.
(Continued)

*Primary Examiner* — Jermie Cozart
(74) *Attorney, Agent, or Firm* — Birch, Stewart, Kolasch & Birch, LLP

(57) ABSTRACT

The present invention provides an imaging module manufacturing method capable of performing positioning of an imaging element unit and a lens unit with high accuracy and provides an imaging module manufacturing device. In a manufacturing device (200), in a state where a top surface (11a) of a housing (11) of a lens unit (10) is adsorbed to an adsorption surface (75d) of an adsorption head (75a) so as to hold the lens unit (10) on a Z axis and an imaging element unit (20) is held on the Z axis, a Z axis direction position of the imaging element unit (20) with respect to the lens unit (10) is changed, a measurement chart (89) is imaged by the imaging element (27), and a position and an inclination of the imaging element unit (20) with respect to the lens unit (10) are adjusted based on imaging signals obtained by the imaging.

20 Claims, 15 Drawing Sheets

(51) Int. Cl.
*H04N 5/232* (2006.01)
*H04N 17/00* (2006.01)

(52) U.S. Cl.
CPC ........... *H04N 5/2257* (2013.01); *H04N 5/232* (2013.01); *H04N 5/23212* (2013.01); *H04N 17/002* (2013.01); *Y10T 29/4978* (2015.01); *Y10T 29/49771* (2015.01); *Y10T 29/49778* (2015.01)

(56) References Cited

FOREIGN PATENT DOCUMENTS

| | | |
|---|---|---|
| JP | 2004-177422 A | 6/2004 |
| JP | 2005-86659 A | 3/2005 |
| JP | 2005-136743 A | 5/2005 |
| JP | 2008-197282 A | 8/2008 |
| JP | 2010-8946 A | 1/2010 |
| JP | 2010-21985 A | 1/2010 |
| JP | 2011-151551 A | 8/2011 |
| JP | 2012-37549 A | 2/2012 |

OTHER PUBLICATIONS

Written Opinion of the International Searching Authority for PCT/JP2014/065465 (PCT/ISA/237) dated Jul. 8, 2014.
International Preliminary Report on Patentability for PCT/JP2014/065465 (PCT/IB/373) dated Mar. 22, 2016.
Written Opinion of the International Searching Authority for PCT/JP2014/065465 (PCT/ISA/237) dated on Jul. 8, 2014.

IMAGE PICKUP MODULE MANUFACTURING METHOD AND IMAGE PICKUP MODULE MANUFACTURING DEVICE

CROSS-REFERENCE TO RELATED APPLICATIONS

This application is a Continuation of PCT International Application No. PCT/JP2014/065465 filed on Jun. 11, 2014, which claims priority under 35 U.S.C § 119(a) to Japanese Patent Application No. 2013-195559 filed on Sep. 20, 2013. Each of the above application(s) is hereby expressly incorporated by reference, in its entirety, into the present application.

BACKGROUND OF THE INVENTION

1. Field of the Invention

The present invention relates to an imaging module manufacturing method and an imaging module manufacturing device.

2. Description of the Related Art

A small and thin imaging module is mounted on a portable electronic device such as a portable phone having an imaging function. The imaging module has a structure in which a lens unit, into which an imaging lens is incorporated, and an imaging element unit into which an imaging element such as a CCD image sensor or a CMOS image sensor is incorporated are integrated with each other.

As the imaging module, there is an imaging module which has an auto focus (AF) mechanism which moves a lens in the lens unit for performing focus adjustment, and an imaging module which has an optical type image blur correction mechanism which relatively moves the lens unit and the imaging element unit in a direction orthogonal to an optical axis for optically correcting blur of a captured image.

For example, JP2010-21985A and JP2010-8946A disclose the imaging module having the AF mechanism, and JP2012-37549A discloses the imaging module having the AF mechanism and the optical type image blur correction mechanism.

In recent years, in an imaging element which is used in an imaging module, not only imaging elements having a low pixel number such as approximately one million pixels to two million pixels but also imaging elements having a high pixel number such as three million pixels to ten million pixels or more are widely used.

In a case where the imaging element of a low pixel number is used, particularly, high accuracy is not required for positioning of the lens unit and the imaging element unit. However, in a case where the imaging element having a high pixel number is used, high accuracy is required for positioning.

JP2010-21985A and JP2005-86659A disclose a technology in which the lens unit and the imaging element unit are fixed to each other after the positioning of the lens unit and the imaging element unit is performed.

In JP2010-21985A, after the lens unit and the imaging element unit are set to an initial position, a chart is captured by the imaging element while the imaging element unit moves in an optical axis direction, and the positions of the lens unit and the imaging element unit are adjusted from the obtained captured image. After the adjustment, the lens unit and the imaging element unit are bonded and fixed to each other.

SUMMARY OF THE INVENTION

In the camera module manufacturing device disclosed in JP2010-21985A, when the lens unit is held by a manufacturing device, the lens unit is held in a state where side surfaces of the lens unit are interposed between arms. In general, when a housing of the lens unit is made of metal, the housing is formed by sheet metal drawing. Accordingly, the side surfaces of the housing are likely to be opened to the outside, and the opening angle also is likely to be varied. Therefore, in the case where the side surfaces are interposed between the arms, in the holding state, the direction of the optical axis of the lens unit is likely to be deviated from a desired state.

JP2005-86659A discloses a method which adsorbs a lens barrel using air so as to hold the lens barrel when the lens barrel and the imaging element unit are positioned. Compared to the housing which covers the lens barrel, the lens barrel is manufactured with high accuracy, and the air adsorption can be easily adopted. However, in order to hold the housing in which the lens barrel or the like is accommodated, it is necessary to devise a method of adsorption. In JP2005-86659A, a specific method of air adsorption when there is a housing is not disclosed.

JP2010-8946A discloses that a top plate portion of a housing of a lens drive unit is adsorbed by a vacuum chuck while the lens drive unit is manufactured or after the lens drive unit is manufactured. However, this adsorption is performed so as to convey the lens drive unit, and is not performed so as to hold the lens unit to the manufacturing device.

The present invention is made in consideration of the above-described circumstances, and an object thereof is to provide a manufacturing method of an imaging module and an imaging module manufacturing device capable of correctly determining a position of a lens unit when an imaging element unit and the lens unit are positioned so as to improve imaging quality.

According to an aspect of the present invention, there is provided a manufacturing method of an imaging module including a lens unit which has a lens group, and an imaging element unit which is fixed to the lens unit and has an imaging element which images an object through the lens group, in which the lens unit includes a metal housing which accommodates the lens group and has a surface perpendicular to an optical axis of the lens group on the object side, and the lens unit includes at least one of the first lens driving unit which moves at least a portion of lenses of the lens group in a first direction along the optical axis of the lens group, and a second lens driving unit and a third lens driving unit which move at least a portion of the lenses of the lens group in a second direction and the third direction orthogonal to the optical axis of the lens group, respectively; the manufacturing method includes: a first process of, on an axis orthogonal to a measurement chart, changing relative positions of the imaging element unit, the lens unit, and the measurement chart in the direction of the axis, and driving the imaging element and imaging the measurement chart through the lens group by the imaging element at each relative position; and a second process of adjusting at least an inclination of the imaging element unit with respect to the lens unit based on imaging signals obtained by imaging the measurement chart using the imaging element, and fixing the imaging element unit to the lens unit, and in the first process, the measurement chart-imaged by the imaging element in a state where the surface of the housing is adsorbed to an adsorption surface of an adsorption head having the adsorption surface perpendicular to the axis so as to hold the lens unit by sucking air from a suction hole provided on the adsorption surface.

According to another aspect of the present invention, there is provided an imaging module manufacturing device for manufacturing an imaging module by the manufacturing method, including: a measurement chart installation portion in which a measurement chart is installed; an imaging element unit holding portion which holds an imaging element unit having an imaging element which images an object through a lens unit having a lens group and a lens drive unit, on an axis orthogonal to the measurement chart installed in the measurement chart installation portion; a probe unit which allows electricity to flow to the lens unit and drive the lens drive unit having first lens driving unit, second lens driving unit and third lens driving unit; a lens unit holding portion which holds the lens unit on the axis between the measurement chart installation portion and the imaging element unit holding portion; a control unit which changes relative positions of the measurement chart installation portion, the lens unit holding portion, and the imaging element unit holding portion in the axial direction, and drives the imaging element of the imaging element unit and images the measurement chart through the lens unit by the imaging element at each relative position; an adjustment portion which adjusts at least an inclination of the imaging element unit with respect to the lens unit based on imaging signals obtained by imaging the measurement chart using the imaging element; and a unit fixing portion which fixes the imaging element unit to the lens unit after the adjustment is performed by the adjustment portion, in which the lens unit holding portion includes an adsorption head which has an adsorption surface orthogonal to the axis, a suction hole which is formed on the adsorption surface, and a suction portion which sucks air from the suction hole, in which the control unit images the measurement chart by the imaging element in a state where the surface of a housing of the lens unit, which accommodates the lens group and has the surface perpendicular to the optical axis of the lens group on the object side, is adsorbed to the adsorption surface by sucking air from the suction hole using the suction portion so as to hold the lens unit on the axis, and the unit fixing portion includes a light source which, when the lens unit is divided into two areas by a straight line which passes through the optical axis of the lens group and is orthogonal to the optical axis viewed from the axial direction, is disposed on each of one divided area side and the other divided area side, irradiates light onto a gap between the lens unit and the imaging element unit to cure a photo-curable adhesive supplied to the gap.

According to the present invention, an imaging module manufacturing method and an imaging module manufacturing device capable of accurately determining the position of the lens unit and improving imaging quality during positioning of the imaging element unit and the lens unit.

DESCRIPTION OF THE PREFERRED EMBODIMENTS

Hereinafter, an embodiment of the present invention will be described with reference to the drawings.

Figure 1:
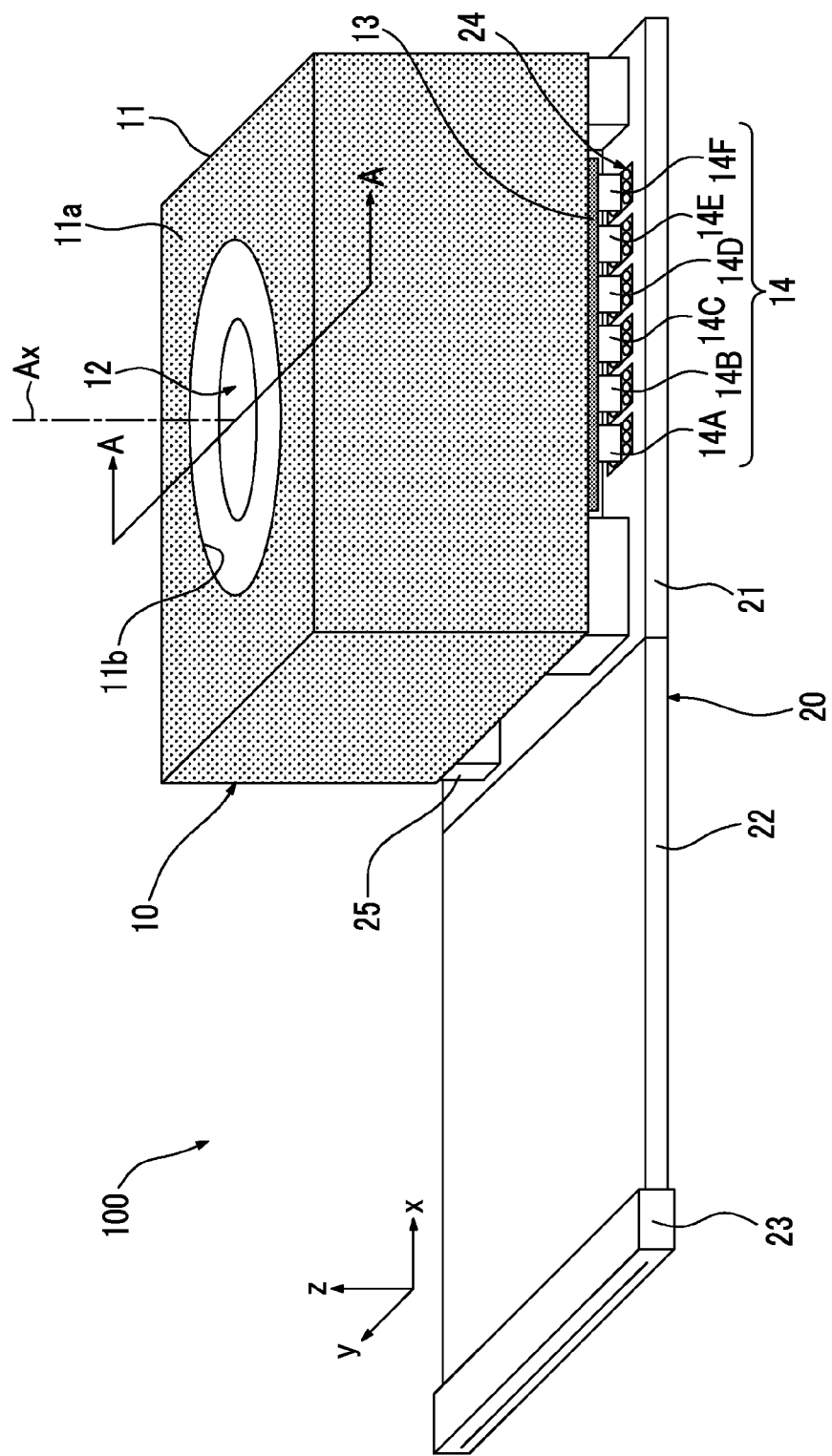
FIG. 1 is an external perspective view of an imaging module 100.

FIG. 1 is an external perspective view of an imaging module 100.

The imaging module 100 includes a lens unit 10 which includes a lens group 12, and an imaging element unit 20 which is fixed to the lens unit 10 and includes an imaging element (not shown in FIG. 1) which captures an object through the lens group 12.

In FIG. 1, a direction along an optical axis Ax of the lens group 12 is defined as a z direction, and two directions which are orthogonal to the z direction and are orthogonal to each other are defined as an x direction and a y direction, respectively.

The lens unit 10 includes a metal housing 11 in which components described below are accommodated. A top surface 11a of the housing 11 is a surface which is perpendicular to the optical axis Ax of the lens group 12.

An opening 11b which has the optical axis Ax of the lens group 12 as the center is formed on the top surface 11a. The imaging module 100 receives light of an object through the lens group 12 from the opening 11b, and performs imaging.

A portion of a flexible substrate 13 accommodated in the housing 11 is exposed outside the housing 11. A lens unit terminal portion 14 including terminals 14A to 14F is connected to the distal end of the exposed portion of the flexible substrate 13.

In addition, as described below, the lens unit terminal portion 14 includes other terminals in addition to the terminals 14A to 14F. However, in FIG. 1, for simplification, only the terminals 14A to 14F are shown, and other terminals are not shown.

Figure 2:
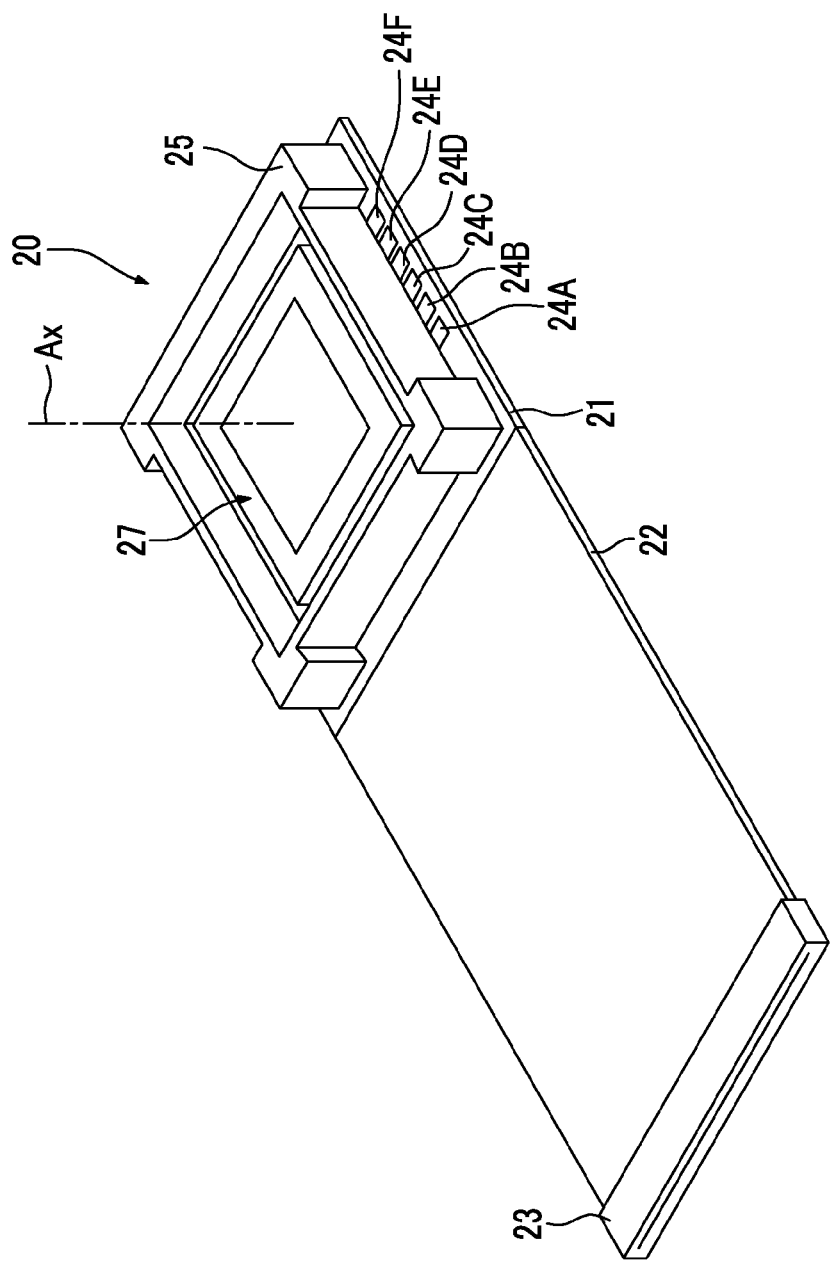
FIG. 2 is an external perspective view of an imaging element unit 20 in a state where a lens unit 10 is omitted in the imaging module 100 shown in FIG. 1.

FIG. 2 is an external perspective view showing a state where the lens unit 10 is omitted in the imaging module 100 shown in FIG. 1.

As shown in FIG. 2, the imaging element unit 20 includes a substrate 21 on which an imaging element 27 such as a CCD image sensor or a CMOS image sensor is formed, and a flexible substrate 22 which is electrically connected to the substrate 21.

A pixel pitch of the imaging element 27 is not particularly limited. However, an imaging element having a pixel pitch of 1.0 µm or less is used as the imaging element 27. Here, the pixel pitch means the minimum distance among distances between centers of photoelectrically converted regions included in pixels provided in the imaging element 27.

In recent years, the pixel pitch of the imaging element has decreased in accordance with an increase of a pixel number. However, in a case where the pixel pitch decreases, an area per one pixel decreases. Accordingly, a radius of an allowable circle of confusion decreases, and a focal depth decreases. In addition, since it is necessary to increase a collected light amount per pixel, an F-number of the lens is likely to be decreased.

Accordingly, in recent years, since the focal depth of the imaging module is very small, it is necessary to perform positioning of the lens unit and the imaging element unit with high accuracy. In a case where the pixel pitch is 1 µm or less, particularly, high positioning accuracy is required.

A tubular cover holder 25 is formed on the substrate 21, and the imaging element 27 is disposed inside the cover holder 25. A cover glass (not shown) is fitted to the upper portion of the imaging element 27 in an inner hollow portion of the cover holder 25.

An imaging element unit terminal portion including terminals 24A to 24F for electrically connecting to the lens unit 10 is provided on the surface of the substrate 21 on the outside of the cover holder 25. Similarly to the lens unit terminal portion 14, in the imaging element unit terminal portion, only some terminals are shown.

An imaging element wire, which is connected to a data output terminal, a drive terminal, or the like of the imaging element 27, is provided on the substrate 21. The imaging element wire is connected to an external connection terminal portion 23, which is provided on the end portion of the flexible substrate 22, via a wire provided on the flexible substrate 22. The external connection terminal portion 23 functions as an electric connection portion which is electrically connected to the imaging element 27.

In addition, a lens unit wire, which is connected to each terminal included in the imaging element unit terminal portion, is provided on the substrate 21. The lens unit wire is connected to the external connection terminal portion 23, which is provided on the end portion of the flexible substrate 22, via the wire provided on the flexible substrate 22.

In a state where the lens unit 10 and the imaging element unit 20 are fixed, each terminal of the lens unit terminal portion 14 and each terminal of the imaging element unit terminal portion corresponding to each terminal of the lens unit terminal portion are electrically connected to each other.

In FIG. 1, the terminal 14A and the terminal 24A are electrically connected to each other, the terminal 14B and the terminal 24B are electrically connected to each other, the terminal 14C and the terminal 24C are electrically connected to each other, the terminal 14D and the terminal 24D are electrically connected to each other, the terminal 14E and the terminal 24E are electrically connected to each other, and the terminal 14F and the terminal 24F are electrically connected to each other.

Figure 3:
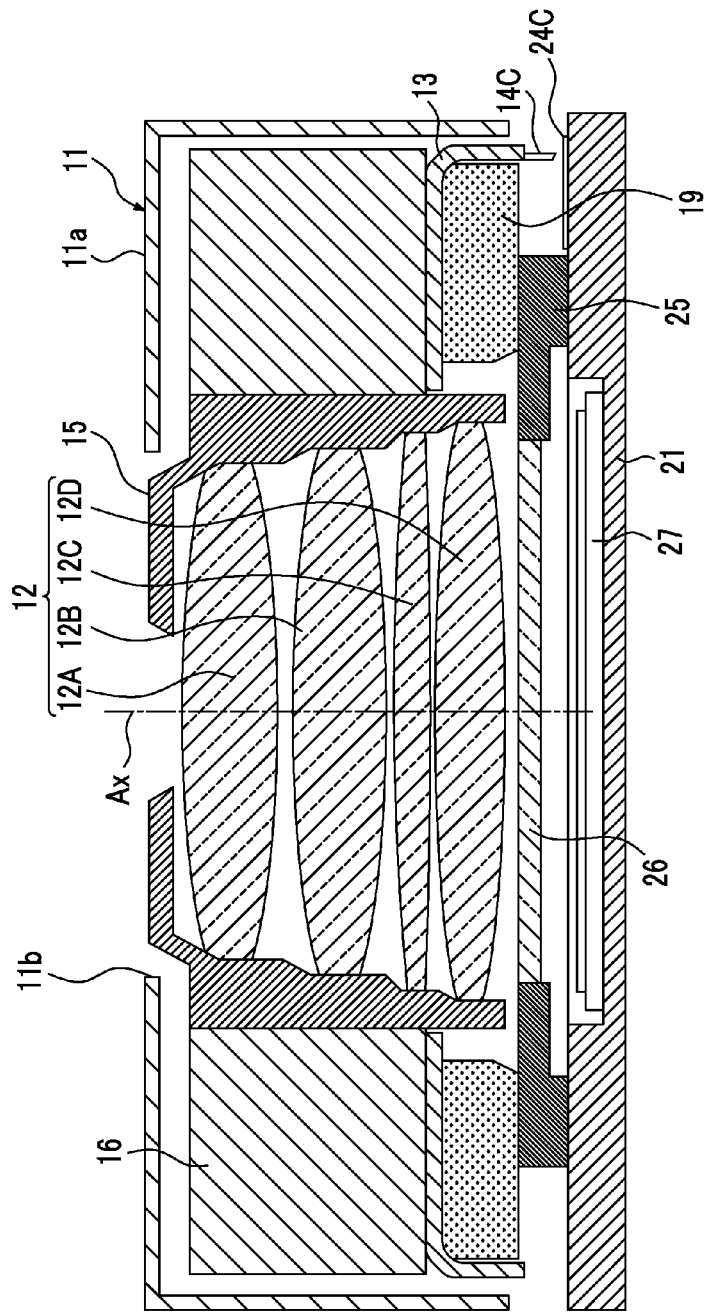
FIG. 3 is a sectional view taken along line A-A of the imaging module 100 shown in FIG. 1.

FIG. 3 is a sectional view taken along line A-A of the imaging module 100 shown in FIG. 1.

As shown in FIG. 3, the imaging element 27 is disposed in a concave section provided on the substrate 21, and is sealed by the cover holder 25 provided on the substrate 21 and a cover glass 26 fitted to the cover holder 25.

In addition, as shown in FIG. 3, the lens unit 10 includes the lens group 12 which includes a plurality of lenses (four lenses 12A to 12D in the example of FIG. 3) disposed above the cover glass 26, a tubular lens barrel 15 which supports the lens group 12, a bottom block 19 which is disposed on the upper surface of the cover holder 25 of the imaging element unit 20, the flexible substrate 13 which is fixed to the bottom block 19, the lens unit terminal portions (only the terminal 14C is shown since FIG. 3 is a sectional view) which are connected to the flexible substrate 13, and a lens drive unit 16 which is formed on the flexible substrate 13.

The lens group 12, the lens barrel 15, the bottom block 19, the flexible substrate 13, and the lens drive unit 16 are accommodated in the housing 11.

The lens drive unit 16 includes a first lens driving unit, a second lens driving unit, a third lens driving unit, and a hall element which is a position detection element for detecting the position of the lens.

The first lens driving unit is a driving unit which moves at least a portion (all lenses of the lens group 12 in the example of FIG. 3) of the lenses of the lens group 12 in a first direction (z direction in FIG. 1) along the optical axis Ax of the lens group 12 so as to perform focus adjustment.

The second lens driving unit and the third lens driving unit are driving units which respectively move at least a portion (all lenses of the lens group 12 in the example of FIG. 3) of the lenses of the lens group 12 in a second direction (x direction in FIG. 1) and a third direction (y direction in FIG. 1) orthogonal to the optical axis Ax of the lens group 12 so as to correct blur of an image captured by the imaging element 27.

Each of the first lens driving unit, the second lens driving unit, and the third lens driving unit is an actuator for moving the lens, and in the present embodiment, is configured of a voice coil motor (VCM). However, each lens driving unit may adopt other known means.

Figure 4:
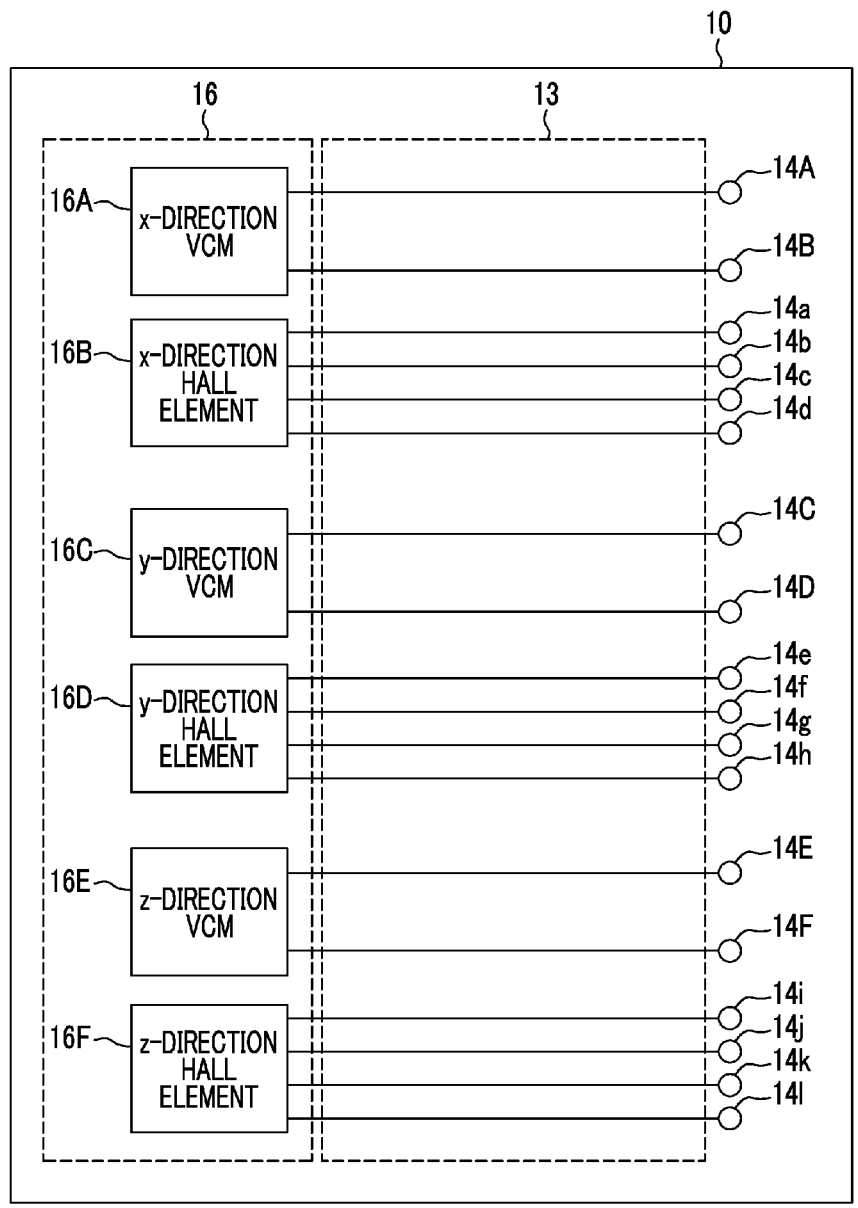
FIG. 4 is a view showing an electric connection configuration inside the lens unit 10 shown in FIG. 1.

FIG. 4 is a block diagram showing an electric connection configuration of the lens unit 10 shown in FIG. 1.

As shown in FIG. 4, the lens drive unit 16 includes an x-direction VCM 16A (the second lens driving unit) for moving the lens group 12 in the x direction, an x-direction hall element 16B for detecting a position of the lens group 12 in an x direction, a y-direction VCM 16C (the third lens driving unit) for moving the lens group 12 in the y direction, a y-direction hall element 16D for detecting a position of the lens group 12 in a y direction, a z-direction VCM 16E (the first lens driving unit) for moving the lens group 12 in the z direction, and a z-direction hall element 16F for detecting a position of the lens group 12 in a z direction.

Two terminals are formed on the x-direction VCM 16A, and the two terminals are electrically connected to the terminal 14A and the terminal 14B via wires formed on the flexible substrate 13, respectively.

Four terminals are formed on the x-direction hall element 16B, and the four terminals are electrically connected to a terminal 14a, a terminal 14b, a terminal 14c, and a terminal 14d via wires formed on the flexible substrate 13, respectively.

Two terminals are formed on the y-direction VCM 16C, and the two terminals are electrically connected to the terminal 14C and the terminal 14D via wires formed on the flexible substrate 13, respectively.

Four terminals are formed on the y-direction hall element 16D, and the four terminals are electrically connected to a terminal 14e, a terminal 14f, a terminal 14g, and a terminal 14h via wires formed on the flexible substrate 13, respectively.

Two terminals are formed on the z-direction VCM 16E, and the two terminals are electrically connected to the terminal 14E and the terminal 14F via wires formed on the flexible substrate 13, respectively.

Four terminals are formed on the z-direction hall element 16F, and the four terminals are electrically connected to a terminal 14i, a terminal 14j, a terminal 14k, and a terminal 14l via wires formed on the flexible substrate 13, respectively.

In addition, the number of required terminals with respect to each lens driving unit and each hall element is an example, and is not limited to the above-described number.

In the imaging module 100 configured as described above, first, the lens unit 10 and the imaging element unit 20 are separately manufactured. Then, an adjustment process for positioning the lens unit 10 and the imaging element unit 20 is performed so that an image forming surface of the object formed by the lens group 12 and an imaging surface of the imaging element 27 are coincident with each other, and thereafter, the lens unit 10 and the imaging element unit 20 are bonded and fixed to each other.

The adjustment process is performed by moving the imaging element unit 20 in a state where a predetermined state of the lens unit 10 is held by a manufacturing device.

Figure 5:
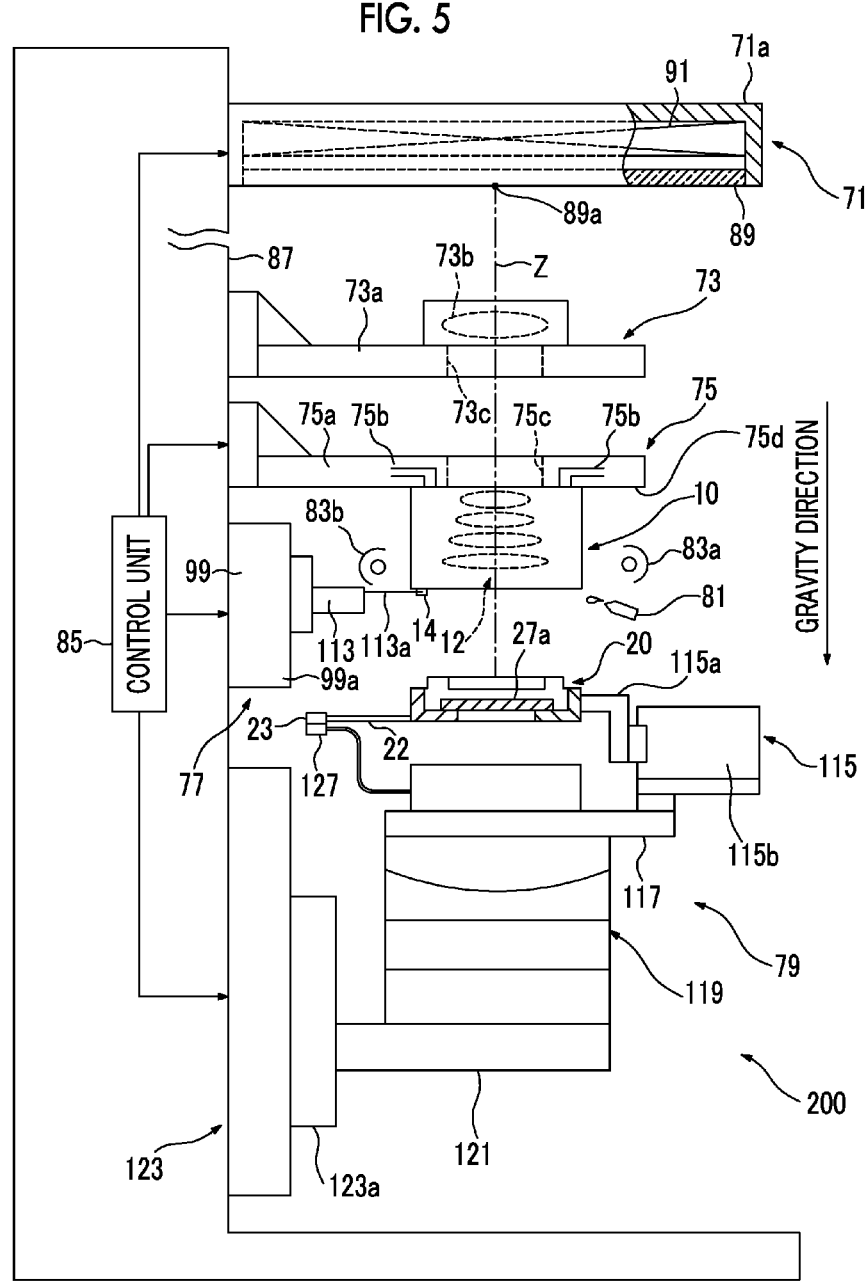
FIG. 5 is a side view showing a schematic configuration of a manufacturing device 200 of the imaging module 100.

FIG. 5 is a side view showing a schematic configuration of the manufacturing device 200 of the imaging module 100.

The imaging module manufacturing device 200 adjusts the position and the inclination of the imaging element unit 20 with respect to the lens unit 10, thereafter fixes the imaging element unit 20 to the lens unit 10 so that the imaging module 100 is completed.

The imaging module manufacturing device 200 includes a chart unit 71, a light collective unit 73, a lens unit holding portion 75, an electric-power supply mechanism 77, an imaging element unit holding portion 79, an adhesive supply portion 81, ultraviolet lamps 83a and 83b as light sources, and a control unit 85 which controls the above-described components. The components are supported by a surface 87 parallel to the gravity direction, and are disposed to be arranged in one direction on the surface 87.

The chart unit 71 is configured of a box-shaped housing 71a as a measurement chart installation portion, a measurement chart 89 which is fitted into the housing 71a, and a light source 91 which is incorporated into the housing 71a and illuminates the measurement chart 89 from the rear surface of the measurement chart 89 with parallel light. For example, the measurement chart 89 is formed of a plastic plate having light diffusibility. The chart surface of the measurement chart 89 is perpendicular to the gravity direction.

Figure 6:
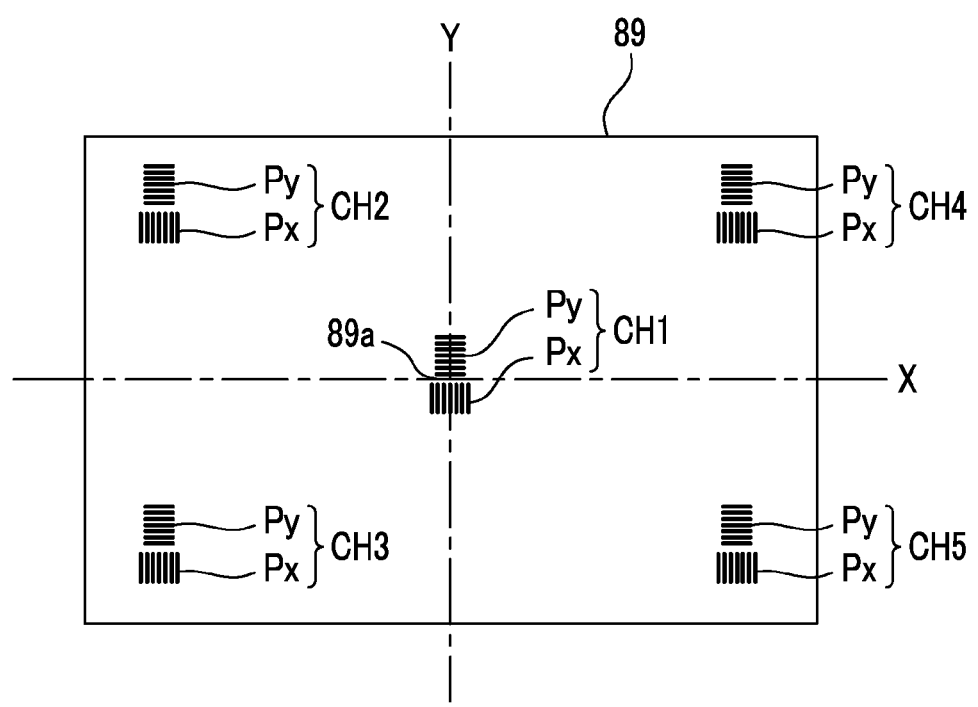
FIG. 6 is a front view of a measurement chart.

FIG. 6 is a view showing the chart surface of the measurement chart 89. The measurement chart 89 is formed in a rectangular shape, and each of a plurality of chart images CH1, CH2, CH3, CH4, and CH5 is printed on the chart surface on which chart patterns are provided.

The plurality of chart images are the same as one another, and are so-called ladder-shaped chart patterns in which black lines are disposed at predetermined intervals. Each chart image is configured of horizontal chart images Px arranged in a horizontal direction of the image, and vertical chart images Py arranged in a vertical direction of the image.

The light collective unit 73 is disposed to face the chart unit 71 on a Z axis which is a perpendicular line with respect to the chart surface of the measurement chart 89 and is a line passing through a chart surface center 89a.

The light collective unit 73 is configured of a bracket 73a which is fixed to the surface 87 and a light collective lens 73b.

The light collective lens 73b collects the light radiated from the chart unit 71, and causes the collected light to enter the lens unit holding portion 75 through an opening 73c formed on the bracket 73a.

Figure 7:
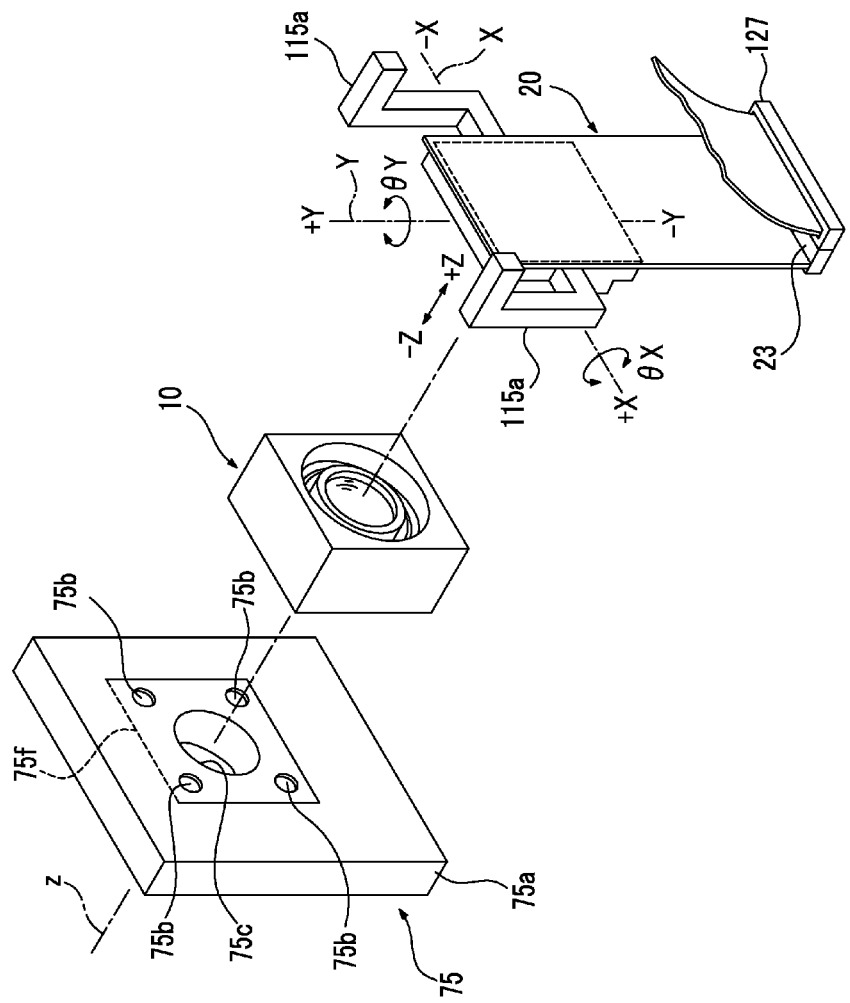
FIG. 7 is an explanatory view showing a state where the lens unit 10 and the imaging element unit 20 are held by the imaging module manufacturing device 200.

FIG. 7 is an explanatory view showing a state where the lens unit 10 and the imaging element unit 20 are held by the imaging module manufacturing device 200.

The lens unit holding portion 75 holds the lens unit 10 on the Z axis between the chart unit 71 and the imaging element unit holding portion 79.

As shown in FIG. 7, the lens unit holding portion 75 includes an adsorption head 75a which includes an adsorption surface 75d for adsorbing the lens unit 10, suction holes 75b (four suction holes in the example of FIG. 7) which are formed on the adsorption surface 75d, and a suction portion 75e (refer to FIG. 11, not shown in FIGS. 5, 7, and 8) which sucks air from the suction holes 75b. For example, each of the suction holes 75b may be a ring-shaped hole.

For example, the adsorption head 75a is formed of metal so as to have stiffness, and an opening 75c through which the light collected by the light collective unit 73 passes is formed on the adsorption head 75a. The adsorption head 75a is disposed so as to face the light collective unit 73 on the Z axis, and the center of the opening 75c is coincident with the Z axis.

The adsorption surface 75d of the adsorption head 75a is a surface perpendicular to the Z axis. The adsorption head 75a is disposed such that the adsorption surface 75d faces a side opposite to the measurement chart 89.

The four suction holes 75b which are formed on the adsorption surface 75d of the adsorption head 75a are connected to the suction portion 75e via pipes (not shown).

The suction portion 75e is configured of a vacuum source which applies negative pressure to the suction holes 75b. Since the suction portion 75e applies the negative pressure to the suction holes 75b, air is sucked from the suction holes 75b, and an object coming into contact with the adsorption surface 75d is adsorbed to the adsorption surface 75d by a suction force. The suction portion 75e is controlled by the control unit 85.

A frame, which is indicated by a reference numeral 75f on the adsorption surface 75d in FIG. 7, shows a range in which an outer edge of the top surface 11a in the housing 11 of the lens unit 10 comes into contact with the adsorption surface 75d. Since the lens unit 10 comes into contact with the adsorption surface 75d such that the frame 75f and the outer edge of the top surface 11a of the lens unit 10 are coincident with each other, the optical axis Ax of the lens unit 10 is coincident with the Z axis.

In the state where the lens unit 10 comes into contact with the adsorption surface 75d such that the frame 75f and the outer edge of the top surface 11a of the lens unit 10 are coincident with each other, the top surface 11a of the housing 11 blocks all four suction holes. Accordingly, when air is sucked from the suction holes 75b, it is possible to stably adsorb the lens unit 10 to the adsorption surface 75d.

Figure 8:
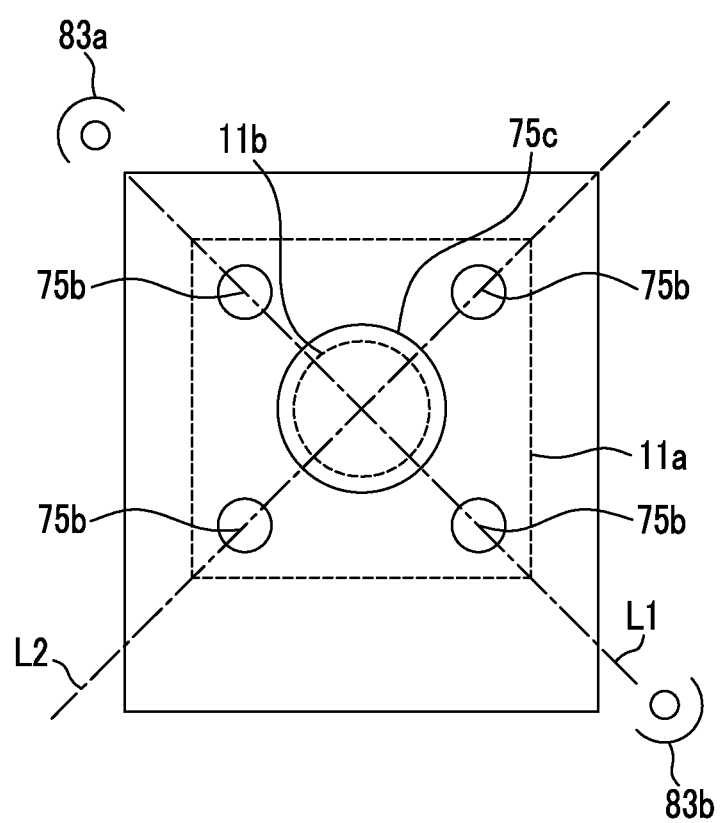
FIG. 8 is a view showing a relationship between an opening 75c which is formed on an adsorption head 75a of a lens unit holding portion 75 and an opening 11b which is formed on a top surface 11a of a housing 11 of the lens unit 10.

FIG. 8 is a view showing a relationship between the opening 75c which is formed on the adsorption head 75a of the lens unit holding portion 75 and an opening 11b which is formed on the top surface 11a of the housing 11 of the lens unit 10.

FIG. 8 is a view when viewed from the imaging element unit holding portion 79 side in the state where the lens unit 10 comes into contact with the adsorption surface 75d, and with respect to the lens unit 10, only the outer edge of the top surface 11a and the opening 11b of the housing 11 are shown by broken lines.

In addition, in FIG. 8, positions of the ultraviolet lamps 83a and 83b described below also are shown.

As shown in FIG. 8, an area of the opening 75c when viewed from the Z axis direction is larger than an area of the opening 11b when viewed from the Z axis direction. Accordingly, in the state of FIG. 8, when viewed from the Z axis direction, the entire area of the opening 11b overlaps with the opening 75c.

Figure 9:
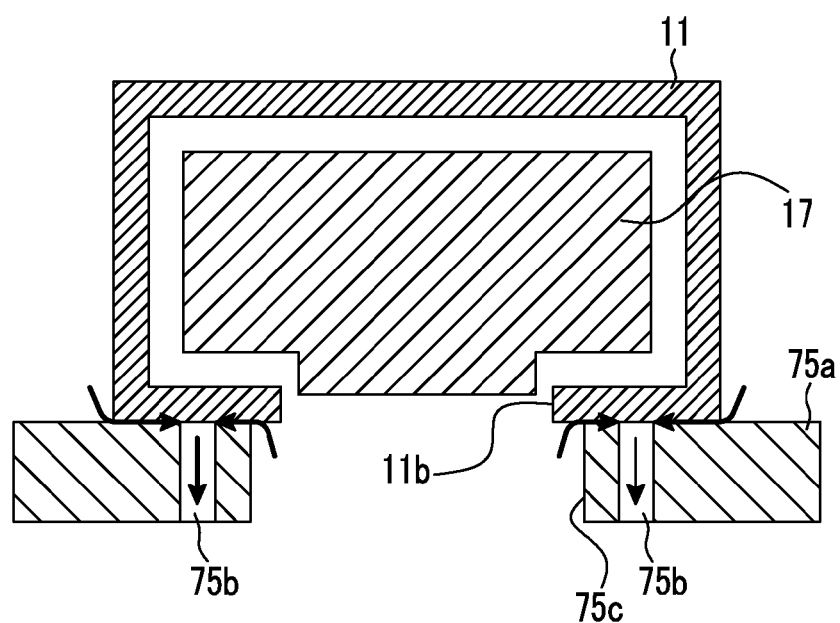
FIG. 9 is a view for explaining a flow of air when the lens unit 10 is adsorbed and held by the lens unit holding portion 75.

FIG. 9 is a view for explaining a flow of air when the lens unit 10 is adsorbed and held by the lens unit holding portion 75.

Figure 10:
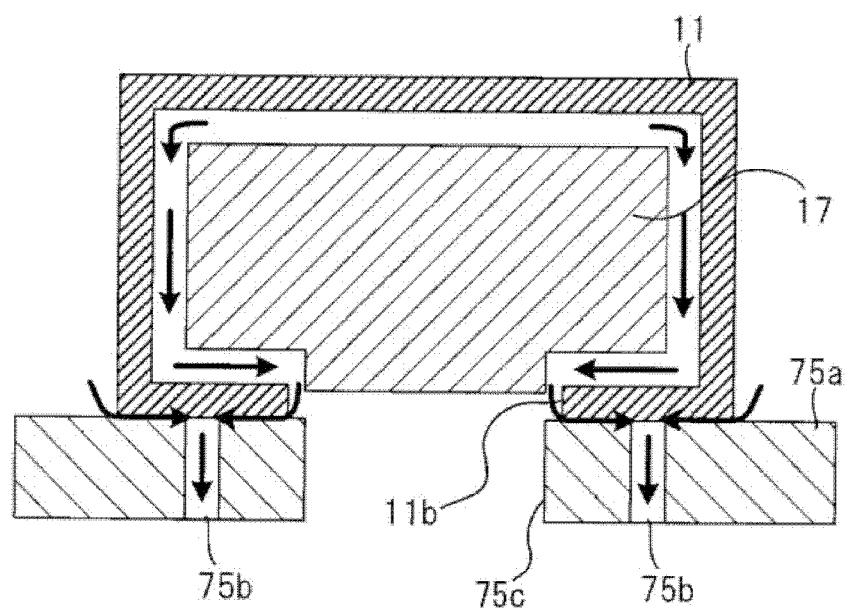
FIG. 10 is a view for explaining a flow of air in a case where an area of the opening 75c is smaller than an area of the opening 11b in FIG. 9.

FIG. 10 is a view for explaining a flow of air in a case where the area of the opening 75c when viewed from the Z axis direction is smaller than an area of the opening 11b when viewed from the Z axis direction in FIG. 9.

A reference number 17 of FIGS. 9 and 10 schematically indicates a member of the lens unit 10 which is accommodated in the housing 11.

As shown in FIG. 9, in a case where the area of the opening 75c is larger than the area of the opening 11b, since the flow of air is generated as shown by black arrows even in the case where air is sucked from the suction holes 75b, it is possible to prevent air from flowing in the inner portion of the housing 11.

Meanwhile, as shown in FIG. 10, in a case where the area of the opening 75c is smaller than the area of the opening 11b, since the flow of air is generated as shown by black arrows in the case where air is sucked from the suction holes 75b, the flow of air is generated in the inner portion of the housing 11.

At least a portion of lenses of the lens group 12 is movable in each of the x direction, the y direction, and the z direction. Accordingly, in a case where the flow of air is generated in the inner portion of the housing 11, the lens moves in an unintended direction, and it is difficult to perform the positioning of the lens unit 10 and the imaging element unit 20 with high accuracy. Accordingly, as shown in FIG. 9, preferably, the area of the opening 75c is larger than the area of the opening 11b.

In addition, as shown in FIG. 10, even when the area of the opening 75c is configured so as to be smaller than the area of the opening 11b, in a case where the adsorption surface 75d of the adsorption head 75a of the lens unit holding portion 75 is configured of an elastic body such as rubber, it is possible to decrease air flowing to a gap between the adsorption surface 75d and the top surface 11a of the housing 11. Accordingly, it is possible to suppress the occurrence of the flow of air in the housing 11.

Return to FIG. 5, the electric-power supply mechanism 77 is configured of a first slide stage 99, and a probe unit 113 which is fixed to a stage portion 99a of the first slide stage 99 and includes six probe pins 113a (only one is shown in FIG. 5).

The first slide stage 99 is an electric precision stage. In the first slide stage, a ball screw is rotated by rotation of a motor (not shown), and a stage portion 99a which engages with the ball screw moves in the Z axis direction and in a direction (a direction from the front side on the paper surface of FIG. 5 toward the rear side) orthogonal to the gravity direction.

The probe unit 113 causes the probe pin 113a to come into contact with each of the terminals 14A to 14F of the lens unit 10 and electricity to flow to each of the terminals 14A to 14F, and the first lens driving unit (z-direction VCM 16E), the second lens driving unit (x-direction VCM 16A), and the third lens driving unit (y-direction VCM 16C) are driven.

The imaging element unit holding portion 79 holds the imaging element unit 20 on the Z axis. In addition, the imaging element unit holding portion 79 can change the position and the inclination of the imaging element unit 20 in the Z axis direction by the control of the control unit 85.

Here, the inclination of the imaging element unit 20 means the inclination of the imaging surface 27a of the imaging element 27 with respect to a plane orthogonal to the Z axis.

The imaging element unit holding portion 79 is configured of a chuck hand 115 which holds the imaging element unit 20 so that the imaging surface 27a faces the chart unit 71 on the Z axis, a biaxial rotation stage 119 which holds an approximately crank-shaped bracket 117 to which the chuck hand 115 is attached, and adjusts the inclination of the imaging element unit 20 around two axes (horizontal X axis and vertical Y axis) orthogonal to the Z axis, and a second slide stage 123 which holds a bracket 121 to which the biaxial rotation stage 119 is attached, and moves the bracket 121 in the Z axis direction.

As shown in FIG. 7, the chuck hand 115 is configured of a pair of clamping members 115a which is bent in an approximately crank shape, and an actuator 115b (refer to FIG. 5) which moves the clamping members 115a in the X axis direction orthogonal to the Z axis. The clamping members 115a are inserted into an outer frame of the imaging element unit 20, and the imaging element unit 20 is held.

In addition, the chuck hand 115 positions the imaging element unit 20 which is interposed by the clamping members 115a so that the optical axis Ax of the lens unit 10 held by the lens unit holding portion 75 and the center position of the imaging surface 27a are substantially coincident with each other.

In addition, when viewed from the Z axis direction, the chuck hand 115 positions the imaging element unit 20 which is interposed by the clamping members 115a so that each terminal of the imaging element unit terminal portion of the imaging element unit 20 overlaps each terminal of the lens unit terminal portion 14 of the held lens unit 10.

The biaxial rotation stage 119 is an electric twin-axis gonio stage, and inclines the imaging element unit 20 in a θx direction around the X axis and a θy direction around the Y axis orthogonal to the Z axis and the X axis by the rotations of two motors (not shown) with the center position of the imaging surface 27a as the rotation center. Accordingly, when the imaging element unit 20 is inclined in each direction, a positional relationship between the center position of the imaging surface 27a and the Z axis is not misaligned.

The second slide stage 123 is an electric precision stage. In the second slide stage, a ball screw is rotated by rotation of a motor (not shown), and a stage portion 123a which engages with the ball screw moves in the Z axis direction. The bracket 121 is fixed to the stage portion 123a.

A connector cable 127, which is connected to the external connection terminal portion 23 provided on the distal end of the flexible substrate 22 of the imaging element unit 20, is attached to the biaxial rotation stage 119. Drive signals are input to the imaging element 27 through the connector cable 127, or captured image signals output from the imaging element 27 are output through the connector cable 127.

The adhesive supply portion 81 and the ultraviolet lamps 83a and 83b configure a unit fixing portion which fixes the lens unit 10 and the imaging element unit 20.

After the adjustment with respect to the position and the inclination of the imaging element unit 20 with respect to the lens unit 10 ends, the adhesive supply portion 81 supplies an adhesive cured by light (here, as an example, ultraviolet curing type adhesive) to a gap between the lens unit 10 and the imaging element unit 20.

The ultraviolet lamps 83a and 83b irradiate the ultraviolet curing type adhesive supplied to the gap with ultraviolet rays, and the adhesive is cured. Moreover, as the adhesive, in addition to the ultraviolet curing type adhesive, an instantaneous adhesive, a thermosetting adhesive, a natural curing adhesive, or the like may be used.

As shown in FIG. 8, when the lens unit 10 is divided into two areas by a straight line L2 which passes through the optical axis Ax of the lens group 12 and is orthogonal to the optical axis Ax when viewed from the Z axis direction, the ultraviolet lamp 83a is disposed on one divided area side, and the ultraviolet lamp 83b is disposed on the other divided area side.

That is, according to the ultraviolet lamps 83a and 83b, the ultraviolet curing type adhesive supplied to the gap is irradiated with light from two directions so as to be cured. Accordingly, unlike a case where the ultraviolet curing type adhesive is irradiated with light from one direction, it is possible to more uniformly perform the curing of the ultraviolet curing type adhesive over the entire module, and it is possible to stably perform fixing of the lens unit 10 and the imaging element unit 20.

In addition, as shown in FIG. 8, when the lens unit 10 is divided into four areas by a straight line L1 and the straight line L2 (the straight lines are orthogonal to each other) which pass through the optical axis Ax of the lens group 12 and are orthogonal to the optical axis Ax when viewed from the Z axis direction, the ultraviolet lamp is disposed on each divided area side, and the ultraviolet curing type adhesive may be irradiated with light from four directions. According to this configuration, it is possible to more stably perform the fixing of the lens unit 10 and the imaging element unit 20.

Figure 11:
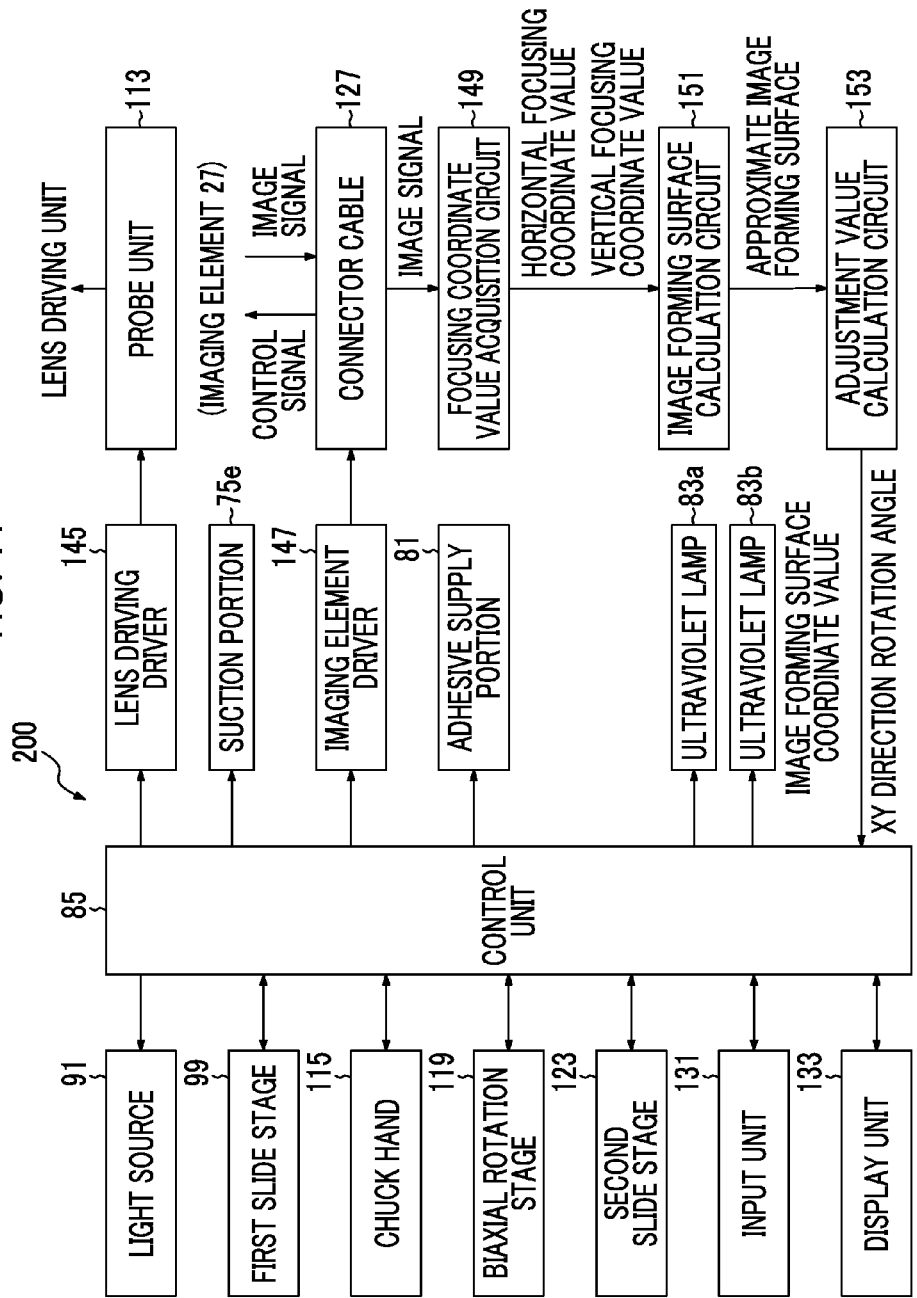
FIG. 11 is a block diagram showing an internal configuration of the imaging module manufacturing device 200.

FIG. 11 is a block diagram showing an internal configuration of the imaging module manufacturing device 200.

As shown in FIG. 11, the above-described portions are connected to the control unit 85. For example, the control unit 85 is a microcomputer which includes a CPU, a ROM, a RAM, or the like, and controls each portion based on a control program stored in the ROM. In addition, an input unit 131 such as a keyboard or a mouse for performing various setting or a display unit 133 on which a setting content, an operation content, operation results, or the like are displayed is connected to the control unit 85.

A lens driving driver 145 is a drive circuit for driving each of the first lens driving unit, the second lens driving unit, and the third lens driving unit, and supplies driving current to each of the first lens driving unit, the second lens driving unit, and the third lens driving unit via the probe unit 113.

An imaging element driver 147 is a drive circuit for the imaging element 27, and inputs driving signals to the imaging element 27 via the connector cable 127.

The focusing coordinate value acquisition circuit 149 acquires focusing coordinate values at a high focusing degree in the Z axis direction with respect to a plurality of imaging positions (positions corresponding to chart images CH1, CH2, CH3, CH4, and CH5 of the measurement chart 89) which are set on the imaging surface 27a of the imaging element 27.

When the focusing coordinate values at the plurality of imaging positions are obtained, the control unit 85 controls the second slide stage 123 and sequentially moves the imaging element unit 20 to a plurality of measurement positions (Z0, Z1, Z2, . . . ) which are discretely set on the Z axis in advance.

In addition, the control unit 85 controls the imaging element driver 147, and images each chart image of the plurality of chart images CH1, CH2, CH3, CH4, and CH5 of the measurement chart 89, which are formed by the lens group 12 at the measurement positions, on the imaging element 27.

The focusing coordinate value acquisition circuit 149 extracts signals of the pixels corresponding to the plurality of imaging positions from imaging signals input via the connector cable 127, and calculates an individual focusing evaluation value with respect to the plurality of imaging positions from the pixel signals. In addition, the measurement position when a predetermined focusing evaluation value is obtained with respect to each imaging position is set to the focusing coordinate value on the Z axis.

For example, as the focusing evaluation value, a Contrast Transfer Function (hereinafter, referred to as a CTF value) may be used. The CTF value is a value which indicates contrast of an image with respect to spatial frequency, and it is regarded that the focusing degree increases as the CTF value increases.

The focusing coordinate value acquisition circuit 149 calculates the CTF value in each of the plurality of directions set on an XY coordinate plane for each of the plurality of measurement positions (Z0, Z1, Z2, . . . ) set on the Z axis with respect to each of the plurality of imaging positions.

For example, as the direction in which the CTF value is calculated, a lateral direction of the imaging surface 27a is set to the horizontal direction (X axis direction), a direction orthogonal to the horizontal direction is set to a vertical direction (Y axis direction), and an X-CTF value and a Y-CTF value which are the CTF values in the directions are calculated.

As a horizontal focusing coordinate value, the focusing coordinate value acquisition circuit 149 acquires coordinates (Zp1, Zp2, Zp3, Zp4, and Zp5) on the Z axis of the measurement position, at which the X-CTF value is the maximum, with respect to the plurality of imaging positions corresponding to the chart images CH1, CH2, CH3, CH4, and CH5. In addition, similarly, as a vertical focusing coordinate value, the focusing coordinate value acquisition circuit 149 acquires the coordinates on the Z axis at the measurement position at which the Y-CTF value is the maximum.

The horizontal focusing coordinate value and the vertical focusing coordinate value of each imaging position acquired from the focusing coordinate value acquisition circuit 149 are input to an image forming surface calculation circuit 151.

The image forming surface calculation circuit 151 deploys a plurality of evaluation points, which are expressed by combining an XY coordinate value of each imaging position when the imaging surface 27a corresponds to an XY coordinate plane and the horizontal focusing coordinate value and the vertical focusing coordinate value on the Z axis obtained for each imaging position, on a three-dimensional coordinate system in which the XY coordinate plane and the Z axis are combined. In addition, the image forming surface calculation circuit 151 calculates an approximate image forming surface, in which the three-dimensional coordinate system is expressed by one plane, based on relative positions of the evaluation points.

Information of the approximate image forming surface obtained from the image forming surface calculation circuit 151 is input to the adjustment value calculation circuit 153.

The adjustment value calculation circuit 153 calculates an image forming surface coordinate value F1 on the Z axis which is an intersection point between the approximate image forming surface and the Z axis, and XY direction rotation angles which are inclinations of the approximate image forming surface with respect to the XY coordinate plane around the X axis and the Y axis, and inputs the calculated values to the control unit 85.

The control unit 85 drives the imaging element unit holding portion 79 based on the image forming surface coordinate value and the XY direction rotation angles input from the adjustment value calculation circuit 153, adjusts the Z axis direction position and the inclination of the imaging element unit 20, and causes the imaging surface 27a to coincide with the approximate image forming surface.

The above-described imaging module manufacturing device 200 schematically performs the following processes.

(1) A process of holding the lens unit 10 and the imaging element unit 20 on the Z axis orthogonal to the chart surface of the measurement chart 89.

(2) A process of changing the Z axis direction position of the imaging element unit 20 held on the Z axis, driving the imaging element 27 via the electric connection portion in a state where electricity flows to each of the first to third lens driving units of the lens unit 10 held on the Z axis at each position, and imaging the measurement chart 89 by the imaging element 27.

(3) A process of adjusting the position and the inclination of the imaging element unit 20 with respect to the lens unit 10 based on the imaging signals obtained by imaging the measurement chart 89 using the imaging element 27, and fixing the imaging element unit 20 to the lens unit 10.

Hereinafter, details of the manufacturing process of the imaging module 100 performed by the imaging module manufacturing device 200 will be described with reference to a flowchart of FIG. 12.

First, adsorption and holding (S1) of the lens unit 10 performed by the lens unit holding portion 75 will be described.

A robot (convey portion) (not shown) conveys the lens unit 10 such that the top surface 11a of the lens unit 10 comes into contact with the adsorption surface 75d of the lens unit holding portion 75. In this state, the frame 75f and the outer edge of the top surface 11a of the housing 11 are coincident with each other.

As the top surface 11a of the lens unit 10 comes into contact with the adsorption surface 75d of the lens unit holding portion 75, the control unit 85 performs suction of air by the suction portion 75e. Accordingly, air is sucked from the suction holes 75b, the top surface 11a of the lens unit 10 is adsorbed to the adsorption surface 75d, and the lens unit 10 is held.

Next, the control unit 85 moves the stage portion 99a of the first slide stage 99 in the direction approaching the lens unit holding portion 75 such that the probe pin 113a comes into contact with each of the terminals 14A to 14F of the lens unit 10. Accordingly, the first to third lens driving units and the lens driving driver 145 are electrically connected to each other.

Next, holding (S2) of the imaging element unit 20 performed by the imaging element unit holding portion 79 will be described.

The control unit 85 controls the second slide stage 123 so as to move the biaxial rotation stage 119 along the Z axis direction, and forms a space in which the imaging element unit 20 can be inserted into a portion between the lens unit holding portion 75 and the biaxial rotation stage 119. The imaging element unit 20 is held by a robot (not shown) and is transferred to the portion between the lens unit holding portion 75 and the biaxial rotation stage 119.

The control unit 85 detects the movement of the imaging element unit 20 using an optical sensor or the like, and moves the stage portion 123a of the second slide stage 123 in the direction approaching the lens unit holding portion 75. In addition, a worker holds the imaging element unit 20 using the clamping members 115a of the chuck hand 115. In addition, the connector cable 127 is connected to the external connection terminal portion 23 of the imaging element unit 20. Accordingly, the imaging element 27 and the control unit 85 are electrically connected to each other. Thereafter, the holding of the imaging element unit 20 is released by a robot (not shown).

In this way, after the lens unit 10 and the imaging element unit 20 are held on the Z axis, the horizontal focusing coordinate value and the vertical focusing coordinate value of each imaging position of the imaging surface 27a are acquired by the focusing coordinate value acquisition circuit 149 (S3).

Specifically, the control unit 85 controls the second slide stage 123 such that the biaxial rotation stage 119 moves in the direction approaching the lens unit holding portion 75, and moves the imaging element unit 20 to an initial measurement position at which the imaging element 27 is closest to the lens unit 10.

The control unit 85 causes the light source 91 of the chart unit 71 to emit light. In addition, the control unit 85 inputs the driving signals from the lens driving driver 145 to the terminals 14A to 14F so as to drive the first to third lens driving units, and holds the x direction position, the y direction position, and the z direction position of the optical axis Ax of the lens group 12 to a reference position (for example, initial position when actually used).

Next, the control unit 85 controls the imaging element driver 147 so as to image the chart images CH1, CH2, CH3, CH4, and CH5 formed by the lens unit 10 on the imaging element 27. The imaging element 27 inputs the captured imaging signals to the focusing coordinate value acquisition circuit 149 via the connector cable 127.

The focusing coordinate value acquisition circuit 149 extracts the signals of the pixel at the imaging position corresponding to each of the chart images CH1, CH2, CH3, CH4, and CH5 from the input imaging signals, and calculates the X-CTF value and the Y-CTF value with respect to each imaging position from the pixel signals. For example, the control unit 85 stores the information of the X-CTF value and the Y-CTF value in the RAM in the control unit 85.

The control unit 85 sequentially moves the imaging element unit 20 to the plurality of measurement positions (Z0, Z1, Z2, . . . ) set along the Z axis direction, and images the chart image of the measurement chart 89 on the imaging element 27 in the state where the x direction position, the y direction position, and the z direction position of the optical axis Ax of the lens group 12 are held to the reference positions. The focusing coordinate value acquisition circuit 149 calculates the X-CTF value and the Y-CTF value at the imaging position of each measurement position.

The focusing coordinate value acquisition circuit 149 selects the maximum value among the plurality of calculated X-CTF values and Y-CTF values with respect to each imaging position, and acquires the Z axis coordinate of the measurement position, at which the maximum value is obtained, as the horizontal focusing coordinate value and the vertical focusing coordinate value at the imaging position.

The horizontal focusing coordinate value and the vertical focusing coordinate value acquired by the focusing coordinate value acquisition circuit 149 are input to the image forming surface calculation circuit 151. For example, the image forming surface calculation circuit 151 calculates an approximately planarized approximate image forming surface F using a least square method (S5).

The information of the approximate image forming surface F calculated by the image forming surface calculation circuit 151 is input to the adjustment value calculation circuit 153. The adjustment value calculation circuit 153 calculates the image forming surface coordinate value F1 which is the intersection point between the approximate image forming surface F and the Z axis, and the XY direction rotation angles which are the inclinations of the approximate image forming surface with respect to the XY coordinate plane around the X axis and the Y axis, and inputs the calculated value and angles to the control unit 85 (S6).

The control unit 85 controls the biaxial rotation stage 119 and the second slide stage 123 serving as the adjustment portions based on the image forming surface coordinate value F1 and the XY direction rotation angles, moves the imaging element unit 20 in the Z axis direction such that the center position of the imaging surface 27a of the imaging element 27 is coincident with the image forming surface coordinate value F1, and adjusts angles of the imaging element unit 20 in the θx direction and the θy direction such that the inclination of the imaging surface 27a is coincident with the approximate image forming surface F (S7).

The control unit 85 performs a confirmation process which confirms the focusing position of each imaging position after the position and the inclination of the imaging element unit 20 are adjusted (S8).

In this confirmation process, each process of the above-described S3 is performed again. After the position and the inclination of the imaging element unit 20 are adjusted, variation of evaluation values corresponding to the horizontal direction and the vertical direction with respect to each of the imaging positions decreases.

After the confirmation process (S8) ends (S4), the control unit 85 moves the imaging element unit 20 in the Z axis direction such that the center position of the imaging surface 27a is coincident with the image forming surface coordinate value F1 (S9).

In addition, the control unit 85 supplies the ultraviolet curing type adhesive from the adhesive supply portion 81 to the gap between the lens unit 10 and the imaging element unit 20 (S10), and cures the ultraviolet curing type adhesive by lighting the ultraviolet lamps 83a and 83b (S11).

After the adhesive is cured and the lens unit 10 and the imaging element unit 20 are fixed to each other, when the imaging module is held by a robot (not shown), the control unit 85 stops the suction of air performed by the suction portion 75e. Accordingly, the suction of air from the suction holes 75b stops, and the adsorption of the top surface 11a of the lens unit 10 is released (Step S12). In addition, the completed imaging module 100 is discharged from the imaging module manufacturing device 200 by a robot (not shown) (S13).

In addition, the lens unit 10 and the imaging element unit 20 are fixed by the ultraviolet curing type adhesive. However, the curing of the ultraviolet curing type adhesive is used for temporary fixation between the lens unit 10 and the imaging element unit 20.

For example, in a state where the lens unit 10 and the imaging element unit 20 are temporarily fixed to each other, the imaging module 100 is discharged from the imaging module manufacturing device 200, a desired process such as cleaning processing is performed, and thereafter, the lens unit 10 and the imaging element unit 20 may be completely fixed to each other by a thermosetting type adhesive or the like.

By manufacturing the imaging module 100 using the above-described manufacturing device 200, when the lens unit 10 is held by the manufacturing device 200, it is possible to prevent the optical axis Ax of the lens unit 10 from being inclined with respect to the Z axis. Accordingly, it is possible to perform the positioning of the lens unit 10 and the imaging element unit 20 with high accuracy.

According to the manufacturing method of the present embodiment, it is not necessary to dispose means (support arm in the related art) for holding the lens unit 10 around the side surfaces of the housing 11 of the lens unit 10.

As a result, it is possible to increase a degree of freedom with respect to disposition of the device (adhesive supply portion 81 or the ultraviolet lamps 83a and 83b) for fixing the lens unit 10 and the imaging element unit 20, the device (electric-power supply mechanism 77) for allowing electricity to flow to the lens unit 10, or the like, and it is possible to realize a reduction in design cost and improvement on maintenance of the manufacturing device 200.

Hereinbefore, as the imaging module, the manufacturing device for manufacturing the model in which the lens unit 10 includes the first to third lens driving units is described. In addition, in a model on which the lens unit 10 having only the first lens driving unit is mounted, or in a model on which the lens unit 10 having only the second lens driving unit and the third lens driving unit is mounted, by adsorbing and holding to the top surface 10a of the lens unit 10 using the above-described method, it is possible to perform the positioning having high accuracy.

Like the imaging module 100, in the model in which the lens unit 10 includes the second lens driving unit and the third lens driving unit, the lens group 12 easily moves in the x direction and the y direction. In addition, in this model, the mechanism inside the housing 11 of the lens unit 10 is complicated, and stiffness of the housing 11 is likely to decrease. Accordingly, if the side surfaces of the housing of the lens unit 10 are held by the arm according to the method of the related art, inclination of the optical axis Ax easily occurs. Therefore, in this model, it is particularly effective to adopt the manufacturing method of the present embodiment.

Moreover, in the case of the model in which the lens unit 10 includes only the first lens driving unit, the number of probes for allowing electricity to flow to lens unit 10 is two. However, in the model in which the lens unit 10 further includes the second lens driving unit and the third lens driving unit, at least six probes are required.

In addition, in the case where electricity also flows to the hall element included in the lens drive unit 16, 18 probes are required. That is, in the case where the lens unit 10 includes the first to third lens driving units, it is significantly difficult to secure a space around the lens unit 10. Accordingly, the method which adsorbs the top surface 10a of the lens unit 10 so as to hold the lens unit 10 is effective.

Figure 12:
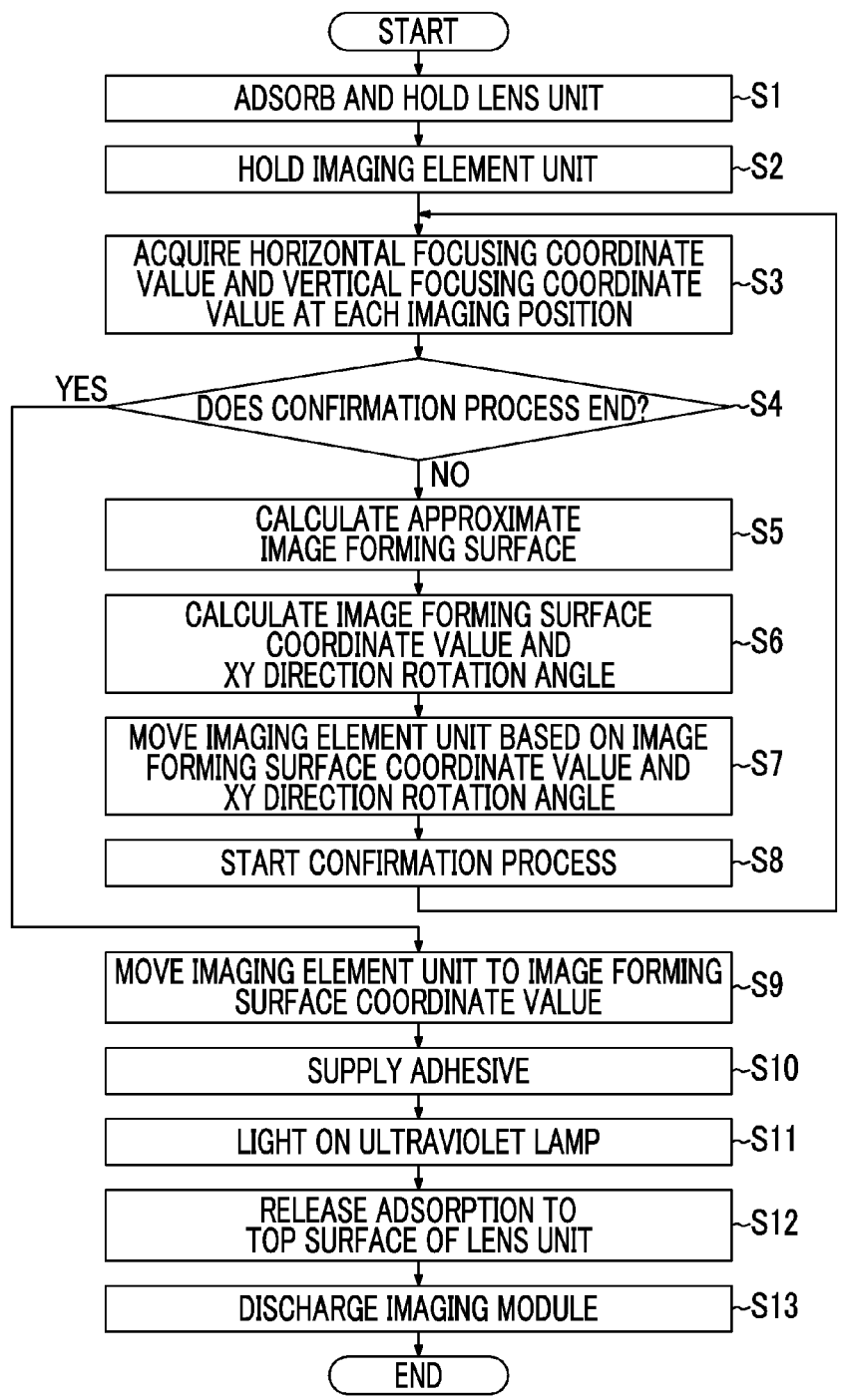
FIG. 12 is a flowchart for explaining a manufacturing process of the image module performed by the imaging module manufacturing device 200.

In the process of S3 in FIG. 12, the focusing coordinate value is acquired by moving the imaging element unit 20 in the state where the Z axis direction position of the lens unit 10 is fixed. However, in a state where the lens unit holding portion 75 is movable in the Z axis direction, by moving the lens unit holding portion 75 in the Z axis direction in the state where the Z axis direction position of the imaging element unit holding portion 79 is fixed or by moving each of the lens unit holding portion 75 and the imaging element unit holding portion 79 in the Z axis direction so as to change the measurement position, the focusing coordinate value may be acquired at each measurement position.

In addition, in a state where the Z axis direction positions of the lens unit holding portion 75 and the imaging element unit holding portion 79 are fixed, by moving the chart unit 71 in the Z axis direction so as to change the measurement position, the focusing coordinate value may be acquired. Moreover, by changing the Z axis direction position of each of the lens unit holding portion 75, the imaging element unit holding portion 79, and the chart unit 71 so as to change the measurement position, the focusing coordinate value may be acquired.

That is, by changing the relative positions in the Z axis direction of the lens unit 10, the imaging element unit 20, and the measurement chart 89 so as to change the measurement position and imaging the measurement chart 89 by the imaging element 27, the focusing coordinate value may be acquired.

In addition, in descriptions of FIG. 12, the plurality of measurement positions are realized by changing the relative positions, and the measurement chart is imaged at each measurement position. However, the imaging of the measurement chart is continuously performed (that is, imaging of a motion picture is performed), and the relative positions may be changed so as to obtain each measurement position during the imaging.

In addition, in the process of S7 in FIG. 12, by moving the imaging element unit 20 in the state where the Z axis direction position of the lens unit 10 is fixed, the Z axis direction position of the imaging element unit 20 with respect to the lens unit 10 is adjusted. However, in the state where the lens unit holding portion 75 is movable in the Z axis direction, by moving the lens unit holding portion 75 in the state where the position of the imaging element unit holding portion 79 is fixed or by moving each of the lens unit holding portion 75 and the imaging element unit holding portion 79, the position adjustment may be performed.

Moreover, in the process of S7 in FIG. 12, not only the Z axis direction position of the imaging element unit 20 with respect to the lens unit 10 but also the inclination thereof is adjusted. However, the adjustment of the inclination may be omitted. For example, in a case where a pixel number of the imaging element 27 is small, it is possible to maintain image quality even when the adjustment of the inclination is not performed.

In this way, in the manufacturing device in which the process of adjusting at least the Z axis direction position of the imaging element unit 20 with respect to the lens unit 10 is performed, as described above, since the lens unit 10 is held by adsorbing the top surface 11a of the housing 11 of the lens unit 10, it is possible to perform the positioning having high accuracy.

In addition, in the process of S7 in FIG. 12, in a case where only the Z axis direction position of the imaging element unit 20 with respect to the lens unit 10 is adjusted, the number of the chart images provided on the chart surface of the measurement chart 89 may be at least one.

Moreover, in the process of S7 in FIG. 12, in a case where the Z axis direction position and the inclination of the imaging element unit 20 with respect to the lens unit 10 are adjusted, the number of the chart images provided on the chart surface of the measurement chart 89 may be at least three.

As described above, in the case where four or more chart images are used, it is possible to adjust the inclination of the imaging element unit 20 with respect to the lens unit 10 with high accuracy.

In addition, hereinbefore, the focusing evaluation value is obtained by imaging the measurement chart 89 in the state where electricity flows to the lens driving unit. However, electricity flowing to the lens driving unit may be omitted. It is possible to perform the positioning having high accuracy by allowing electricity to flow the lens driving unit. In addition, in the case where electricity flows to the lens driving unit, the lens driving unit, which is the object to which electricity flows, does not need to be set to the first to third lens driving units. That is, electricity may flow only to the lens driving unit in which accuracy of the positioning is required.

Moreover, preferably, a positioning portion for allowing the center of the opening 75c and the center of opening 11b of the lens unit 10 to coincide with each other is provided on the adsorption surface 75d of the lens unit holding portion 75.

Figure 13:
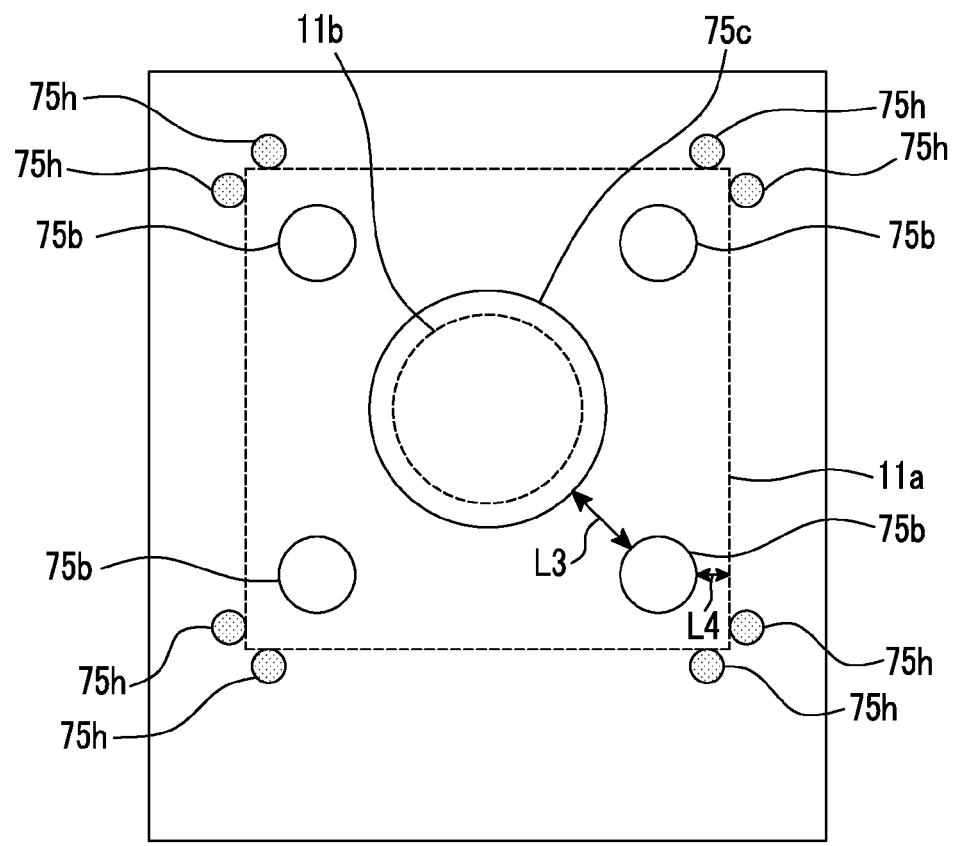
FIG. 13 is a view showing a configuration in which a positioning portion is provided on an adsorption surface 75d of the lens unit holding portion 75.

FIG. 13 is a view showing a configuration in which the positioning portion is provided on the adsorption surface 75d of the lens unit holding portion 75, and is a view when the adsorption head 75a is viewed from the imaging element unit holding portion 79 side. In FIG. 13, the outer edge of the top surface 11a and the opening 11b of the housing 11 when the lens unit 10 comes into contact with the adsorption surface 75d are shown by broken lines.

A reference numeral 75h in FIG. 13 indicates the positioning portion, and for example, the positioning portion is configured of a columnar pin which uprightly stands on the adsorption surface 75d, or the like. In order to limit a contact range of the lens unit 10 with respect to the top surface 11a of the housing 11, two positioning portions 75h are disposed on each of four corners of the contact range, and a total of eight positioning portions 75h are disposed.

In this way, by providing the positioning portions 75h, it is possible to allow the Z axis and the optical axis Ax of the lens unit 10 to easily coincide with each other. In addition, the positioning portion 75h is not limited to the convex portion which is provided on the adsorption surface 75d as a separate member. For example, only the contact range of the adsorption head 75a with respect to the top surface 11a is engraved, and the side walls of the engraved portion may be configured so as to be positioning portions.

In a plan view shown in FIG. 13, when a length of a straight line, which connects the contact range (a broken line frame indicated by a reference numeral 11a) of the housing 11 of the lens unit 10 limited by the positioning portions 75h and the suction holes 75b at the shortest distance, is defined as L4, and a length of a straight line which connects the opening 75c and the suction hole 75b at the shortest distance is defined as L3, preferably, L3 is longer than L4.

Accordingly, when air is sucked from the suction holes 75b, the air is easily sucked from the outside of the top surface 11a of the housing 11 which is adsorbed to the adsorption surface 75d rather than from the opening 75c side, and it is possible to prevent air from flowing in the inner portion of the lens unit 10.

Figure 14:
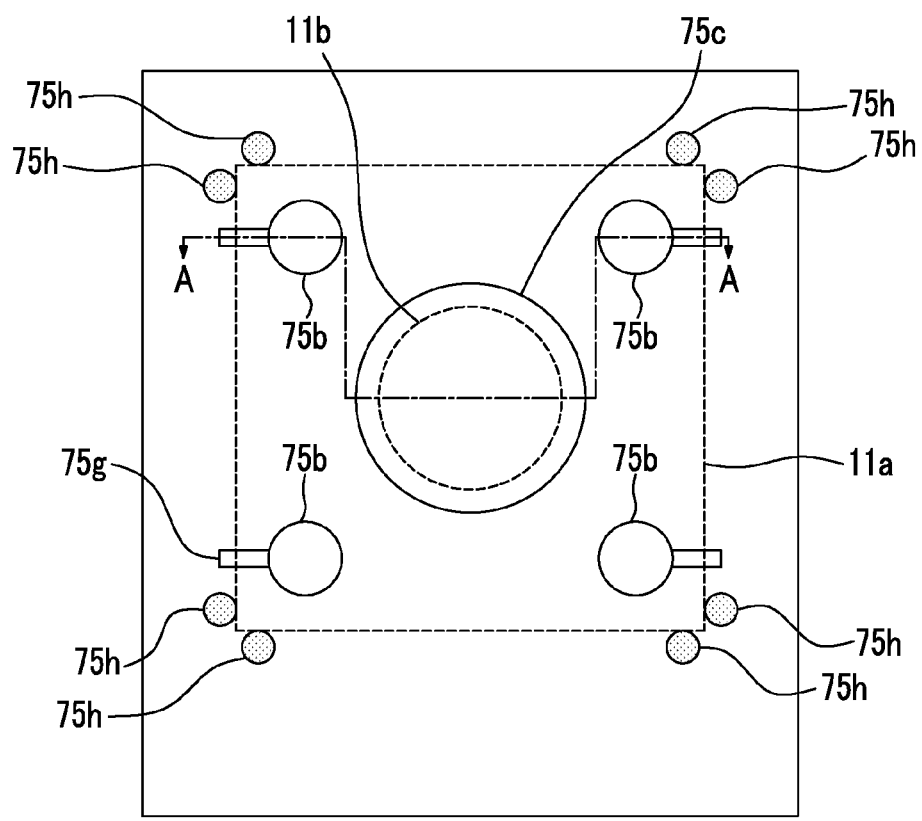
FIG. 14 is a view showing a modification example of the lens unit holding portion 75 shown in FIG. 13.
Figure 15:
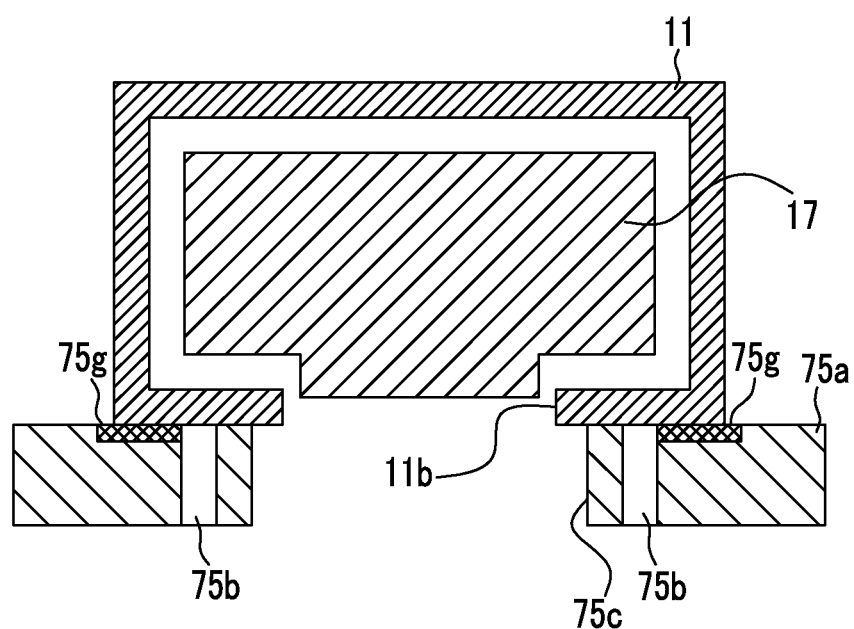
FIG. 15 is a sectional view taken along line A-A of FIG. 14.

FIG. 14 is a view showing a modification example of the lens unit holding portion 75 shown in FIG. 13. FIG. 15 is a sectional view taken along line A-A of FIG. 14.

As shown in FIGS. 14 and 15, grooves 75g serving as hole portions, which connect the exposed surface outside the contact range (broken line frame indicated by the reference numeral 11a) of the housing 11 limited by the positioning portions 75h and the suction holes 75b, are provided on the adsorption surface 75d. Instead of the grooves 75g, the adsorption surface 75d and the suction holes 75b may be connected by through-holes penetrating the inner portion of the adsorption head 75a.

In this way, air passages are provided from the suction holes 75b to the outside of the contact range of housing 11, air is easily sucked from the outside of the top surface 11a of the housing 11 adsorbed to the adsorption surface 75d rather than from the opening 75c, and it is possible to prevent air from flowing in the inner portion of the lens unit 10.

Hereinbefore, the case where the top surface 11a of the housing 11 of the lens unit 10 is a surface perpendicular to the optical axis Ax of the lens group 12 is described. This perpendicular state does not necessarily need to be strictly perpendicular, and in a case where the manufacturing device includes the mechanism which adjusts the inclination of the imaging element unit 20 with respect to the lens unit 10, the perpendicular state may be any state as long as it is within a stroke of the inclination adjustment. In a case where the inclination adjustment mechanism is not present, a deviation of approximately 1° is allowed.

As described above, the following matters are disclosed in the present specification.

A disclosed manufacturing method of an imaging module including a lens unit which has a lens group, and an imaging element unit which is fixed to the lens unit and has an imaging element which images an object through the lens group, in which the lens unit includes a metal housing which accommodates the lens group and has a surface perpendicular to an optical axis of the lens group on the object side, in which the manufacturing method includes: a first process of, on an axis orthogonal to a measurement chart, changing relative positions of the imaging element unit, the lens unit, and the measurement chart in the direction of the axis, and driving the imaging element and imaging the measurement chart through the lens group by the imaging element at each relative position; and a second process of adjusting at least an inclination of the imaging element unit with respect to the lens unit based on imaging signals obtained by imaging the measurement chart using the imaging element, and fixing the imaging element unit to the lens unit, and in the first process, the measurement chart is imaged by the imaging element in a state where the surface of the housing is adsorbed to an adsorption surface of an adsorption head having the adsorption surface perpendicular to the axis so as to hold the lens unit by sucking air from a suction hole provided on the adsorption surface.

According to this method, since the surface of the housing of the lens unit on the object side is adsorbed to the manufacturing device so as to hold the lens unit, it is possible to prevent the optical axis of the lens group in the lens unit from being inclined with respect to the axis orthogonal to the measurement chart, and it is possible to accurately determine the position of the lens unit during the positioning of the imaging element unit and the lens unit and improve imaging quality.

In addition, according to this method, to dispose means for holding the lens unit around the side surfaces of the housing of the lens unit is unnecessary so that a space around the lens unit is easily secured. As a result, for example, it is possible to easily dispose the device for fixing the lens unit and the imaging element unit, the device for allowing electricity to flow to the lens unit, or the like, and it is possible to realize a reduction in design cost and improvement on maintenance of the manufacturing device.

In the disclosed manufacturing method of an imaging module, in the second process, when the lens unit is divided into two areas by a straight line which passes through the optical axis of the lens group and is orthogonal to the optical axis when viewed from the axial direction, light may irradiate from each of one divided area side and the other divided area side to cure a photo-curable adhesive supplied to a gap between the lens unit and the imaging element unit, thereby the lens unit and the imaging element may be fixed to each other.

According to this method, since a portion between the lens unit and the imaging element unit is irradiated with light from at least two directions, it is possible to uniformly cure the coated adhesive over the entire module, and it is possible to stably perform fixing of the lens unit and the imaging element unit.

In addition, in this method, it is necessary to dispose at least two light sources or the like around the side surfaces of the housing of the lens unit. However, in the lens unit, since the top surface of the object side is adsorbed and held, it is possible to easily dispose the light source or the like around the side surfaces of the housing of the lens unit.

In the disclosed manufacturing method of an imaging module, in the second process, when the lens unit is divided into four areas by the straight line and an additional straight line which is orthogonal to the straight line and is orthogonal to the optical axis, each of the four divided area sides may be irradiated with light so as to cure the adhesive, thereby the lens unit and the imaging element unit may be fixed to each other.

According to this method, since the portion between the lens unit and the imaging element unit is irradiated with light form four directions, it is possible to more uniformly cure the coated adhesive over the entire module, and it is possible to more stably perform fixing of the lens unit and the imaging element unit.

In the disclosed manufacturing method of an imaging module, the lens unit may include at least one of the first lens driving unit which moves at least a portion of lenses of the lens group in a first direction along the optical axis of the lens group, and a second lens driving unit and a third lens driving unit which move at least a portion of the lenses of the lens group in a second direction and the third direction orthogonal to the optical axis of the lens group, respectively.

According to this method, since the lens unit, in which the inclination of the optical axis is easily generated, is used in the method of holding the lens unit using grasping, improvement effects of the positioning of the lens unit and the imaging element unit are especially remarkable.

In the disclosed manufacturing method of an imaging module, the adsorption surface may use the adsorption head which is configured of an elastic body.

According to this method, since the adsorption surface of the adsorption head of the manufacturing device is configured of an elastic body, it is possible to prevent air from flowing in the inner portion of the lens unit due to suction, and it is possible to prevent the movable lenses included in the lens group from moving during the suction.

In the disclosed manufacturing method of an imaging module, a first opening through which the lens group receives light of the object may be formed on the surface of the housing, a second opening for passing through light from the measurement chart may be formed on the adsorption surface of the adsorption head, an area of the second opening may be larger than an area of the first opening when viewed from the axial direction, and in the first process, the surface of the housing may be adsorbed to the adsorption surface so as to hold the lens unit in a state where the entire area of the first opening overlaps the second opening when viewed from the axial direction.

According to this method, since the surface of the housing is adsorbed to the adsorption surface so as to hold the lens unit in the state where the entire portion of the first opening overlaps the second opening when viewed from the axial direction, it is possible to prevent air from flowing in the inner portion of the lens unit due to suction, and it is possible to prevent the movable lenses included in the lens group from moving during the suction.

In the disclosed manufacturing method of an imaging module, a pixel pitch of the imaging element may be 1.0 µm or less.

In a case where the pixel pitch of the imaging element is 1.0 µm or less, since accuracy of the positioning is especially required, the present invention is particularly effective.

A disclosed imaging module manufacturing device, includes: a measurement chart installation portion in which a measurement chart is installed; an imaging element unit holding portion which holds an imaging element unit having an imaging element which images an object through a lens unit having a lens group, on an axis orthogonal to the measurement chart installed in the measurement chart installation portion; a lens unit holding portion which holds the lens unit on the axis between the measurement chart installation portion and the imaging element unit holding portion; a control unit which changes relative positions of the measurement chart installation portion, the lens unit holding portion, and the imaging element unit holding portion in the axial direction, and drives the imaging element of the imaging element unit and images the measurement chart through the lens unit by the imaging element at each relative position; an adjustment portion which adjusts at least an inclination of the imaging element unit with respect to the lens unit based on imaging signals obtained by imaging the measurement chart using the imaging element; and a unit fixing portion which fixes the imaging element unit to the lens unit after the adjustment is performed by the adjustment portion, in which the lens unit holding portion includes an adsorption head which has an adsorption surface orthogonal to the axis, a suction hole which is formed on the adsorption surface, and a suction portion which sucks air from the suction hole, in which the control unit images the measurement chart by the imaging element in a state where a surface of a metal housing of the lens unit, which accommodates the lens group and has the surface perpendicular to the optical axis of the lens group on the object side, is adsorbed to the adsorption surface by sucking air from the suction hole using the suction portion so as to hold the lens unit on the axis, and the unit fixing portion includes a light source which, when the lens unit is divided into two areas by a straight line which passes through the optical axis of the lens group and is orthogonal to the optical axis when viewed from the axial direction, is disposed on each of one divided area side and the other divided area side, irradiates a gap between the lens unit and the imaging element unit with light, and cures a photo-curable adhesive supplied to the gap.

In the disclosed imaging module manufacturing device, when the lens unit is divided into four areas by the straight line and a straight line which is orthogonal to the straight line and is orthogonal to the optical axis, the light source may be disposed on each of the four divided areas.

In the disclosed imaging module manufacturing device, the adsorption surface of the adsorption head may be configured of an elastic body.

In the disclosed imaging module manufacturing device, the unit fixing portion may include an adhesive supply portion which supplies the photo-curable adhesive to the gap between the lens unit and the imaging element unit.

In the disclosed imaging module manufacturing device, the adsorption head may include a positioning portion for positioning the surface of the housing of the lens unit, and a hole portion which connects the suction hole and an exposed surface of the adsorption head disposed outside from a contact range of the surface limited by the positioning portion.

According to this configuration, when air is sucked from the suction hole and the lens unit is held, it is possible to suppress the occurrence of the flow of air in the inner portion of the lens unit.

In the disclosed imaging module manufacturing device, a positioning portion for positioning the surface of the housing of the lens unit may be formed on the adsorption head, an opening for allowing light from the measurement chart to pass through the lens unit may be formed on the adsorption surface, and the shortest distance from an outer edge of a contact surface of the surface of the housing limited by the positioning portion to the suction hole is shorter than the shortest distance from the opening to the suction hole.

According to this configuration, when air is sucked from the suction hole and the lens unit is held, it is possible to suppress the occurrence of the flow of air in the inner portion of the lens unit.

A manufacturing method of an imaging module of the present invention is effectively applied to manufacturing of an imaging module which is mounted on an electric device such as a portable phone, a spectacle type electronic device, or a wrist watch type electronic device, particularly.

EXPLANATION OF REFERENCES

100: imaging module
10: lens unit
11: housing
12: lens group
13: flexible substrate
14A to 14F: lens unit terminal portion
16: lens drive unit
16A: x-direction VCM
16B: x-direction hall element
16C: y-direction VCM
16D: y-direction hall element
16E: z-direction VCM
16F: z-direction hall element
20: imaging element unit
21: substrate
22: flexible substrate
23: external connection terminal portion
24A to 24F: imaging element unit terminal portion
27: imaging element
200: imaging module manufacturing device
71: chart unit
89: measurement chart
75: lens unit holding portion 75a: adsorption head
75b: adsorption hole
75c: opening
75d: adsorption surface
75e: suction portion
75g: groove
75h: positioning portion
81: adhesive supply portion
83a and 83b: ultraviolet lamp
79: imaging element unit holding portion
85: control unit
Ax: optical axis
z: direction along optical axis
x: direction orthogonal to z direction
y: direction orthogonal to z direction

What is claimed is:

1. A manufacturing method of an imaging module including a lens unit which has a lens group, and an imaging element unit which is fixed to the lens unit and has an imaging element which images an object through the lens group,
    wherein the lens unit includes a metal housing which accommodates the lens group and has a surface perpendicular to an optical axis of the lens group on the object side, and the lens unit includes at least one of a first lens driving unit which moves at least a portion of lenses of the lens group in a first direction along the optical axis of the lens group, and a second lens driving unit and a third lens driving unit which move at least a portion of the lenses of the lens group in a second direction and a third direction orthogonal to the optical axis of the lens group, respectively;
    wherein the manufacturing method comprise:
    a first process of, on an axis orthogonal to a measurement chart, changing relative positions of the imaging element unit, the lens unit, and the measurement chart in the direction of the axis, and driving the imaging element and imaging the measurement chart through the lens group by the imaging element at each relative position; and
    a second process of adjusting at least an inclination of the imaging element unit with respect to the lens unit based on imaging signals obtained by imaging the measurement chart using the imaging element, and fixing the imaging element unit to the lens unit, and
    wherein in the first process, the measurement chart is imaged by the imaging element in a state where the surface of the housing is adsorbed to an adsorption surface of an adsorption head having the adsorption surface perpendicular to the axis so as to hold the lens unit by sucking air from a suction hole provided on the adsorption surface.

2. The manufacturing method of an imaging module according to claim 1,
    wherein the adsorption surface uses the adsorption head which is configured of an elastic body.

3. The manufacturing method of an imaging module according to claim 1,
    wherein, in the second process, when the lens unit is divided into two areas by a straight line which passes through the optical axis of the lens group and is orthogonal to the optical axis viewed from the axial direction, light is irradiated from each of one divided area side and the other divided area side to cure a photo-curable adhesive supplied to a gap between the lens unit and the imaging element unit, thereby the lens unit and the imaging element are fixed to each other.

4. The manufacturing method of an imaging module according to claim 3,
    wherein a pixel pitch of the imaging element is 1.0 μm or less.

5. The manufacturing method of an imaging module according to claim 3,
    wherein the adsorption surface uses the adsorption head which is configured of an elastic body.

6. The manufacturing method of an imaging module according to claim 3,
    wherein, in the second process, when the lens unit is divided into four areas by the straight line and a straight line which is orthogonal to the straight line and is orthogonal to the optical axis, light is irradiated from each of the four divided area sides to cure the adhesive, thereby the lens unit and the imaging element unit are fixed to each other.

7. The manufacturing method of an imaging module according to claim 6,
    wherein the adsorption surface uses the adsorption head which is configured of an elastic body.

8. The manufacturing method of an imaging module according to claim 6,
    wherein a pixel pitch of the imaging element is 1.0 μm or less.

9. An imaging module manufacturing device, comprising:
    a measurement chart installation portion in which a measurement chart is installed;
    an imaging element unit holding portion which holds an imaging element unit having an imaging element which images an object through a lens unit having a lens group and a lens drive unit, on an axis orthogonal to the measurement chart installed in the measurement chart installation portion;
    a probe unit which allows electricity to flow to the lens unit and drive the lens drive unit having first lens driving unit, second lens driving unit and third lens driving unit;
    a lens unit holding portion which holds the lens unit on the axis between the measurement chart installation portion and the imaging element unit holding portion;
    a control unit which changes relative positions of the measurement chart installation portion, the lens unit holding portion, and the imaging element unit holding portion in the axial direction, and drives the imaging element of the imaging element unit and images the measurement chart through the lens unit by the imaging element at each relative position;
    an adjustment portion which adjusts an inclination of the imaging element unit with respect to the lens unit based on imaging signals obtained by imaging the measurement chart using the imaging element; and
    a unit fixing portion which fixes the imaging element unit to the lens unit after the adjustment is performed by the adjustment portion,
    wherein the lens unit holding portion includes an adsorption head which has an adsorption surface orthogonal to the axis, a suction hole which is formed on the adsorption surface, and a suction portion which sucks air from the suction hole,
    wherein the control unit images the measurement chart by the imaging element in a state where a surface of a metal housing of the lens unit, which accommodates the lens group and has a surface perpendicular to the optical axis of the lens group on the object side, is adsorbed to the adsorption surface by sucking air from the suction hole using the suction portion so as to hold the lens unit on the axis, and wherein the unit fixing portion includes a light source which, when the lens unit is divided into two areas by a straight line which passes through the optical axis of the lens group and is orthogonal to the optical axis viewed from the axial direction, is disposed on each of one divided area side and the other divided area side, irradiates light onto a gap between the lens unit and the imaging element unit to cure a photo-curable adhesive supplied to the gap.

10. The imaging module manufacturing device according to claim 9, wherein the adsorption head includes a positioning portion for positioning the surface of the housing of the lens unit, and a hole portion which connects the suction hole and an exposed surface of the adsorption head disposed outside from a contact range of the surface limited by the positioning portion.

11. The imaging module manufacturing device according to claim 9, wherein the unit fixing portion includes an adhesive supply portion which supplies the photo-curable adhesive to the gap between the lens unit and the imaging element unit.

12. The imaging module manufacturing device according to claim 9, wherein the adsorption surface of the adsorption head is configured of an elastic body.

13. The imaging module manufacturing device according to claim 12, wherein the unit fixing portion includes an adhesive supply portion which supplies the photo-curable adhesive to the gap between the lens unit and the imaging element unit.

14. The imaging module manufacturing device according to claim 12, wherein the adsorption head includes a positioning portion for positioning the surface of the housing of the lens unit, and a hole portion which connects the suction hole and an exposed surface of the adsorption head disposed outside from a contact range of the surface limited by the positioning portion.

15. The imaging module manufacturing device according to claim 9, wherein when the lens unit is divided into four areas by the straight line and a straight line which is orthogonal to the straight line and is orthogonal to the optical axis, the light source is disposed on each of the four divided areas.

16. The imaging module manufacturing device according to claim 15, wherein the adsorption head includes a positioning portion for positioning the surface of the housing of the lens unit, and a hole portion which connects the suction hole and an exposed surface of the adsorption head disposed outside from a contact range of the surface limited by the positioning portion.

17. The imaging module manufacturing device according to claim 15, wherein the unit fixing portion includes an adhesive supply portion which supplies the photo-curable adhesive to the gap between the lens unit and the imaging element unit.

18. The imaging module manufacturing device according to claim 15, wherein the adsorption surface of the adsorption head is configured of an elastic body.

19. The imaging module manufacturing device according to claim 18, wherein the unit fixing portion includes an adhesive supply portion which supplies the photo-curable adhesive to the gap between the lens unit and the imaging element unit.

20. The imaging module manufacturing device according to claim 18, wherein the adsorption head includes a positioning portion for positioning the surface of the housing of the lens unit, and a hole portion which connects the suction hole and an exposed surface of the adsorption head disposed outside from a contact range of the surface limited by the positioning portion.

* * * * *